(12) United States Patent
te Booij et al.

(10) Patent No.: US 10,154,138 B2
(45) Date of Patent: Dec. 11, 2018

(54) SYSTEM AND METHOD FOR OPTIMIZING PHYSICAL PLACEMENT OF CONTACT CENTER AGENTS ON A CONTACT CENTER FLOOR

(71) Applicant: Genesys Telecommunications Laboratories, Inc., Daly City, CA (US)

(72) Inventors: Merijn te Booij, Burlingame, CA (US); Kentis Gopalla, Burlingame, CA (US); Herbert Willi Artur Ristock, Walnut Creek, CA (US)

( * ) Notice: Subject to any disclaimer, the term of this patent is extended or adjusted under 35 U.S.C. 154(b) by 0 days.

(21) Appl. No.: 15/224,143

(22) Filed: Jul. 29, 2016

(65) Prior Publication Data

US 2018/0034965 A1 Feb. 1, 2018

(51) Int. Cl.
*H04M 3/00* (2006.01)
*H04M 5/00* (2006.01)
*H04M 3/51* (2006.01)
*G06Q 10/06* (2012.01)
*H04M 3/523* (2006.01)

(52) U.S. Cl.
CPC .... *H04M 3/5175* (2013.01); *G06Q 10/06393* (2013.01); *H04M 3/5232* (2013.01); *H04M 2203/402* (2013.01)

(58) Field of Classification Search
CPC ........... H04M 3/5175; H04M 3/42221; H04M 3/5191; H04M 3/5233; G06Q 10/06393
USPC ................ 379/265.09, 265.01, 309
See application file for complete search history.

(56) References Cited

U.S. PATENT DOCUMENTS

| | | | | |
|---|---|---|---|---|
| 6,449,603 | B1 * | 9/2002 | Hunter | G06K 9/6229 706/15 |
| 2009/0228318 | A1 * | 9/2009 | Ara | G06Q 10/06398 705/7.42 |
| 2010/0142698 | A1 | 6/2010 | Spottiswoode et al. | |
| 2012/0300920 | A1 | 11/2012 | Fagundes et al. | |

(Continued)

FOREIGN PATENT DOCUMENTS

| | | |
|---|---|---|
| EP | 1107559 A2 | 6/2001 |
| KR | 1020130099423 A | 9/2013 |

OTHER PUBLICATIONS

Vidrascu, Laurence, et al., "Annotation and Detection of Blended Emotions in Real Human-Human Dialogs Recorded in a Call Center," 2005 IEEE International Conference on Multimedia and Expo, Conference date Jul. 6-8, 2005, 4 pages.

(Continued)

*Primary Examiner* — Quynh Nguyen

(57) ABSTRACT

A method includes: identifying, by a processor, one or more physical arrangements of resources in a customer contact center; predicting, by the processor, for each of the one or more physical arrangements of resources, a predicted performance metric of the physical arrangement of resources in accordance with one or more working environment parameters of the customer contact center; identifying, by the processor, a particular physical arrangement of the one or more physical arrangements having a corresponding predicted performance metric satisfying a threshold performance among the one or more physical arrangements; and outputting, by the processor, the particular physical arrangement of resources in the customer contact center.

13 Claims, 16 Drawing Sheets

(56) References Cited

U.S. PATENT DOCUMENTS

| | | |
|---|---|---|
| 2013/0148525 A1* | 6/2013 | Cuadra Sanchez ... H04L 41/147 |
| | | 370/252 |
| 2014/0233719 A1 | 8/2014 | Vymenets et al. |
| 2015/0117632 A1 | 4/2015 | Konig et al. |
| 2015/0189088 A1 | 7/2015 | Surridge et al. |
| 2018/0034966 A1 | 2/2018 | te Booij et al. |

OTHER PUBLICATIONS

"New Directions in Call Center Design Demanding Challenges for a Complex Workplace," Herman Miller, Inc. 2008, available online at http://www.hermanmiller.com/research/research-summaries/new-directions-in-call-center-design.html, 7 pages.
SeatMatch, "Efficiently Plan and Optimize Your Call Center Seating," available online at https://web.archive.org/web/20141222062451/https:/seatmatch.com/, 2014 Scintella Solutions, 2 pages.
Feintzeig, Rachel, "The New Science of Who Sits Where at Work Companies Try to Boost Productivity by Micromanaging Seating Arrangements," Oct. 8, 2013, WSJ, available online at http://www.wsj.com/articles/SB10001424052702304441404579123230310600884, 7 pages.
Lehrer, Jonah, "Groupthink The brainstorming myth." The New Yorker, Jan. 30, 2012, 21 pages.
U.S. Appl. No. 15/143,274, Yochai Konig, et al.
International Search Report and Written Opinion for Application No. PCT/US2017/044487, dated Nov. 8, 2017, 15 pages.

* cited by examiner

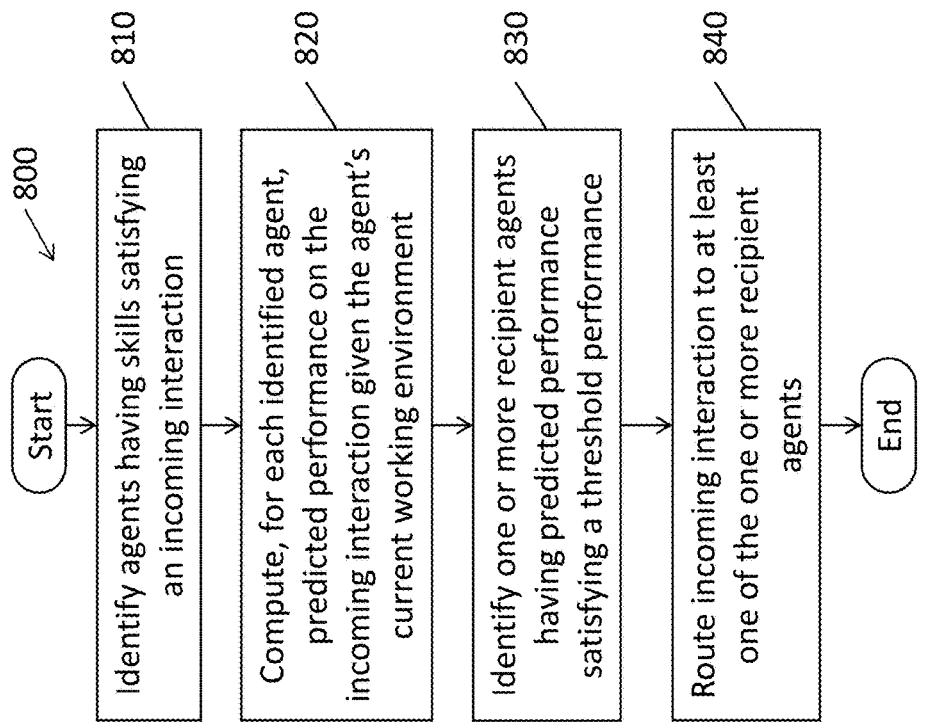

SYSTEM AND METHOD FOR OPTIMIZING PHYSICAL PLACEMENT OF CONTACT CENTER AGENTS ON A CONTACT CENTER FLOOR

FIELD

Aspects of embodiments of the present invention relate to the field of software for operating contact centers, in particular, software for monitoring performance of a contact center and for improving or optimizing the physical arrangement and logical grouping of resources of the contact center.

BACKGROUND

Generally, a contact center staffed with agents serves as an interface between an organization, such as a company, and outside entities, such as customers. For example, human sales agents at contact centers may assist customers in making purchasing decisions and may receive purchase orders from those customers. Similarly, human support agents at contact centers may assist customers in solving problems with products or services provided by the organization. Interactions between contact center agents and outside entities (customers) may be conducted by speech voice (e.g., telephone calls or voice over IP or VoIP calls), video (e.g., video conferencing), text (e.g., emails and text chat), or through other media. In addition, agents may frequently collaborate with or get help from other agents and supervisors. Agents also frequently share resources within the contact center. These resources may electronic hardware (such as printers, servers, and telephony equipment), common areas (such as break areas, restrooms, and walkways), and people (such as coworkers, supervisors, subject matter experts, and managers).

Agent performance may generally be measured using one or more performance indicators or metrics, sometimes referred to as Key Performance Indicators (KPIs). These performance indicators relate to, for example, interaction average handle time (AHT) and customer sentiment score, such as a net promoter score (NPS), and may be used to evaluate agent performance during periodic reviews, to identify potential areas of improvement, and to compare the performance of various groups of agents.

In many circumstances, the agents of a contact center share a physical space in a building in which the agents use separate workstations in the physical space. This space may be, for example, an open floorplan of desks, a collection of cubicles arranged in a space, or a collection of offices (e.g., private or shared). It is desirable to identify a relationship between physical placement and logical grouping of resources, such as workstations, shared equipment, and agents, in the physical contact center with contact center KPIs, to place the resources and assign them to resource groups in a way that improves or optimizes KPIs.

SUMMARY

Aspects of embodiments of the present invention relate to the measurement and analysis of the impact of the physical placement or location of resources within a contact center and the allocation of resource groups, such as agent group composition, based on key performance indicators (KPIs). Aspects of embodiments of the present invention also relate to the improvement of the physical arrangement and logical grouping of agents and resources within a contact center (for example, the physical arrangement of resources on the contact center floor and logical grouping of which agents work together and which agents share various resources) in order to improve or optimize overall contact center efficiency, as measured by KPIs. Aspects of embodiments of the present invention are also directed to routing interactions to agents in accordance with characteristics of the physical environments occupied by the agents.

According to one embodiment of the present invention, a method for generating a visualization of performance of agents of a contact center includes: collecting, by a processor, data from a plurality of different applications of the contact center, the data including performance metrics of the agents of the contact center and workforce management data including the locations of the agents within the contact center; correlating, by the processor, the data from the plurality of different applications with the workforce management data; overlaying, by the processor, the correlated data of at least one of the performance metrics on a floorplan of a contact center in accordance with the locations of the agents within the contact center to generate the visualization of the performance metrics of the agents of the contact center; and outputting, by the processor, the visualization of the performance metrics of the agents of the contact center.

The data may be stored in a plurality of different formats, the method further including converting, by the processor, the data from the plurality of different formats into a common format.

The performance metrics may include least one of: agent utilization, agent occupancy, average handle time, average hold time, first call resolution rate, abandonment rate, net promoter score, conversion rate, agent adherence to workforce schedule, and agent mood.

According to one embodiment of the present invention, a method for generating a visualization of a social network of agents of a contact center, the agents conducting interactions between customers and the contact center includes: collecting, by a processor, data regarding internal communications between agents within a contact center, the communications including at least one of: interaction forwarding, interaction conferencing, and text message; identifying, by the processor, for each agent of the contact center, one or more frequent conferee agents; generating, by the processor, a plurality of social networks of the agents in accordance with the identified one or more frequent conferee agents of each of the agents of the contact center; retrieving, by the processor, locations of the agents within the contact center; overlaying, by the processor, at least one of the social networks of the agents on a floorplan of the contact center in accordance with the locations of agents of the social network to generate the visualization of the social networks of the agents of the contact center; and outputting, by the process, the visualization of the social networks of the agents of the contact center.

According to one embodiment of the present invention, a method for generating a visualization of interaction flow through a contact center conducting a plurality of interactions with customers includes: collecting, by a processor, data regarding transfers of interactions between a plurality of departments of the contact center; retrieving, by the processor, locations of the departments of the contact center; overlaying, by the processor, a plurality of indicators of volumes of transfers between departments of the contact center to generate the visualization; and outputting, by the processor, the visualization.

According to one embodiment of the present invention, a method includes: identifying, by a processor, one or more physical arrangements of resources in a customer contact center; predicting, by the processor, for each of the one or more physical arrangements of resources, a predicted performance metric of the physical arrangement of resources in accordance with one or more working environment parameters of the customer contact center; identifying, by the processor, a particular physical arrangement of the one or more physical arrangements having a corresponding predicted performance metric satisfying a threshold performance among the one or more physical arrangements; and outputting, by the processor, the particular physical arrangement of resources in the customer contact center.

The predicting the predicted performance metric for the physical arrangement of resources in the customer contact center may include: retrieving, by the processor, a plurality of predictors of agent performance, each predictor corresponding to one of a plurality of agents of the customer contact center; predicting, by the processor, a predicted performance metric of each agent in the physical arrangement of resources based on the plurality of predictors of agent performance; and computing, by the processor, the predicted performance metric of the physical arrangement of resources in the customer contact center in accordance with the predicted performance metric of each agent in the physical arrangement of resources.

A predictor of the plurality of predictors of agent performance may be generated by: retrieving one or more historical performance metrics of an agent corresponding to the predictor; retrieving one or more historical working environment parameters corresponding to the agent; correlating the one or more historical performance metrics of the agent with the one or more historical working environment parameters of the agent; and computing a plurality of parameters controlling a relationship between the one or more historical working environment parameters of the agent and the one or more historical performance metrics of the agent.

Each of the plurality of predictors of agent performance may include a linear regression model between the one or more working environment parameters and a performance metric, the working environment parameters including a physical characteristic of a location within a customer contact center.

Each of the plurality of predictors of agent performance may include a neural network having input features including the one or more working environment parameters, and an output corresponding to the predicted performance metric.

The one or more working environment parameters may include at least one of: air temperature; noise level; light level; distance to one or more locations within the customer contact center; and security level.

At least one of the one or more working environment parameters may be collected by a plurality of sensors located in the customer contact center.

The noise level may be collected from one or more recordings of voice interactions between agents and customers.

The distance to the one or more locations within the customer contact center may be computed from one or more floor plans of the customer contact center.

The light level may be estimated based on one or more floor plans of the customer contact center.

The predicted performance metric may include at least one of agent utilization, agent occupancy, average handle time, average hold time, first call resolution rate, abandonment rate, net promoter score, conversion rate, agent adherence to workforce schedule, and agent mood.

According to one embodiment of the present invention, a method for modifying routing of interactions in a customer contact center in accordance with local disruptions includes: monitoring, by a processor, a performance metric in a portion of the customer contact center, the portion of the customer contact center corresponding to a physical location within the customer contact center; comparing, by the processor, the performance metric with a typical performance value; in response to determining that the performance metric is in a normal range, continuing to route interactions to the portion of the customer contact center; and in response to determining that the performance metric is outside the normal range, refraining from routing interactions to the portion of the customer contact center.

According to one embodiment of the present invention, a method for routing an incoming interaction to an agent of a customer contact center includes: identifying, by a processor, one or more agents of the customer contact center, each of the one or more agents having one or more skills satisfying one or more skills required by the incoming interaction; computing, by the processor, for each identified agent, a predicted performance metric in accordance with the one or more skills required by the incoming interaction and in accordance with a working environment of the agent; identifying, by the processor, one or more recipient agents having a predicted performance metric satisfying a threshold performance; and routing, by the processor, the incoming interaction to at least one of the one or more recipient agents.

The computing the predicted performance metric for each identified agent may include: retrieving, by the processor, a predictor corresponding to the identified agent; supplying, by the processor, one or more parameters of the working environment of the agent to the predictor; and outputting, by the processor, a predicted performance metric in accordance with the predictor.

The predictor may include a linear regression model between the one or more working environment parameters and a performance metric.

The predictor may include a neural network having input features including the one or more working environment parameters, and an output corresponding to the predicted performance metric.

According to one embodiment of the present invention, a system includes: means for identifying one or more physical arrangements of resources in a customer contact center; means for predicting, for each of the one or more physical arrangements of resources, a predicted performance metric of the physical arrangement of resources in accordance with one or more working environment parameters of the customer contact center; means for identifying a particular physical arrangement of the one or more physical arrangements having a corresponding predicted performance metric satisfying a threshold performance among the one or more physical arrangements; and means for outputting the particular physical arrangement of resources in the customer contact center.

The system may further include: means for retrieving a plurality of predictors of agent performance, each predictor corresponding to one of a plurality of agents of the customer contact center; means for predicting a predicted performance metric of each agent in the physical arrangement of resources based on the plurality of predictors of agent performance; and means for computing a predicted overall performance of the physical arrangement of resources in the customer contact center in accordance with the predicted performance metric of each agent in the physical arrangement of resources.

BRIEF DESCRIPTION OF THE DRAWINGS

The accompanying drawings, together with the specification, illustrate exemplary embodiments of the present invention, and, together with the description, serve to explain the principles of the present invention.

FIG. 6D is a flowchart illustrating a method according to one embodiment of the present invention for routing interactions to agents based on agent's skills as well as physical characteristics of the workstation and predicted agent performance at the agent's current workstation.

DETAILED DESCRIPTION

Figure 1:
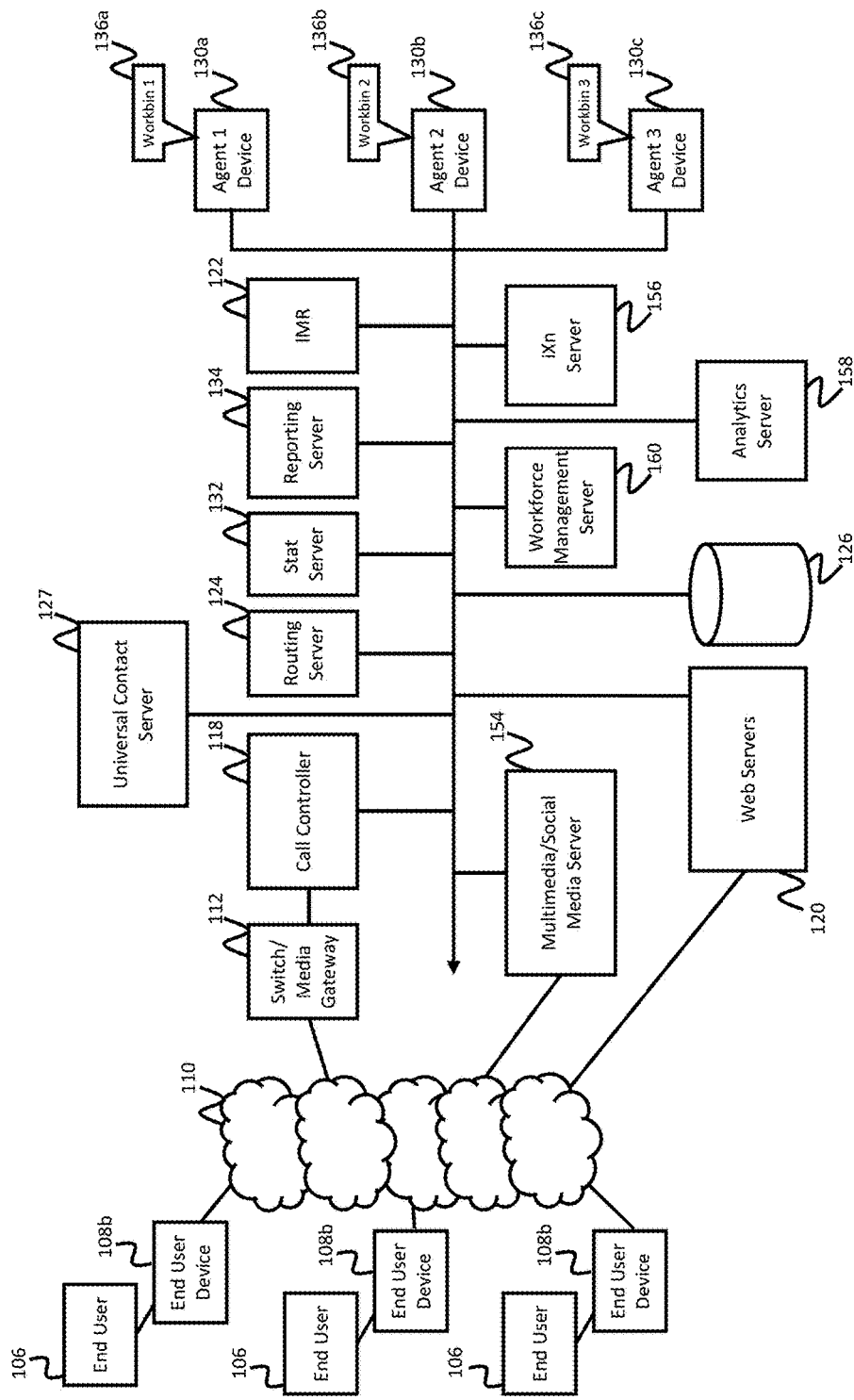
FIG. 1 is a schematic block diagram of a system for supporting a contact center in providing contact center services according to one exemplary embodiment of the invention.

FIG. 1 is a schematic block diagram of a system for supporting a contact center in providing contact center services according to one exemplary embodiment of the invention. The contact center may be referred to as a customer contact center. The contact center may be an in-house facility to a business or enterprise for serving the enterprise in performing the functions of sales and service relative to the products and services available through the enterprise. In another aspect, the contact center may be operated by a third-party service provider. According to some embodiments, the contact center may operate as a hybrid system in which some components of the contact center system are hosted at the contact center premise and other components are hosted remotely (e.g., in a cloud-based environment). The contact center may be deployed in equipment dedicated to the enterprise or third-party service provider, and/or deployed in a remote computing environment such as, for example, a private or public cloud environment with infrastructure for supporting multiple contact centers for multiple enterprises. The various components of the contact center system may also be distributed across various geographic locations and computing environments and not necessarily contained in a single location, computing environment, or even computing device.

According to one example embodiment, the contact center system manages resources (e.g. agents, support personnel, computers, telecommunications equipment, mobile devices, internet-of-things devices, and self-service resources) to enable delivery of services via telephone or other communication mechanisms. Such services may vary depending on the type of contact center, and may range from customer service to help desk, emergency response, telemarketing, order taking, and the like.

Customers, potential customers, or other end users (collectively referred to as customers or end users, e.g., end users 106) desiring to receive services from the contact center may initiate inbound communications (e.g., telephony calls) to the contact center via their end user devices 108a-108c (collectively referenced as 108). Each of the end user devices 108 may be a communication device conventional in the art, such as, for example, a telephone, wireless phone, smart phone, personal computer, electronic tablet, and/or the like. Users operating the end user devices 108 may initiate, manage, and respond to telephone calls, emails, chats, text messaging, web-browsing sessions, and other multi-media transactions.

Inbound and outbound communications from and to the end user devices 108 may traverse a telephone, cellular, and/or data communication network 110 depending on the type of device that is being used, where these devices may include internet-of-things (IoT) devices. For example, the communications network 110 may include a private or public switched telephone network (PSTN), local area network (LAN), private wide area network (WAN), and/or public wide area network such as, for example, the Internet. The communications network 110 may also include a wireless carrier network including a code division multiple access (CDMA) network, global system for mobile communications (GSM) network, or any wireless network/technology conventional in the art, including but to limited to 3G, 4G, LTE, and the like. Various communications protocols may be used on these networks. For example, IoT devices may use the Message Queuing Telemetry Transport (MQTT) protocol.

According to one example embodiment, the contact center includes a switch/media gateway 112 coupled to the communications network 110 for receiving and transmitting telephony calls between end users and the contact center. The switch/media gateway 112 may include a telephony switch or communication switch configured to function as a central switch for agent level routing within the center. The switch may be a hardware switching system or a soft switch implemented via software. For example, the switch 112 may include an automatic call distributor, a private branch exchange (PBX), an IP-based software switch, and/or any other switch with specialized hardware and software configured to receive Internet-sourced interactions and/or telephone network-sourced interactions from a customer, and route those interactions to, for example, an agent telephony or communication device. In this example, the switch/media gateway establishes a voice path/connection (not shown) between the calling customer and the agent telephony device, by establishing, for example, a connection between the customer's telephony device and the agent telephony device.

According to one exemplary embodiment of the invention, the switch is coupled to a call controller 118 which may, for example, serve as an adapter or interface between the switch and the remainder of the routing, monitoring, and other communication-handling components of the contact center.

The call controller 118 may be configured to process PSTN calls, VoIP calls, and the like. For example, the communication server 118 may be configured with computer-telephony integration (CTI) software for interfacing with the switch/media gateway and contact center equipment. In one embodiment, the call controller 118 may include a session initiation protocol (SIP) server for processing SIP calls. According to some exemplary embodiments, the call controller 118 may, for example, extract data about the customer interaction such as the caller's telephone number, often known as the automatic number identification (ANI) number, or the customer's internet protocol (IP) address, or email address, and communicate with other CC components in processing the interaction.

According to one exemplary embodiment of the invention, the system further includes an interactive media response (IMR) server 122, which may also be referred to as a self-help system, virtual assistant, or the like. The IMR server 122 may be similar to an interactive voice response (IVR) server, except that the IMR server 122 is not restricted to voice, but may cover a variety of media channels including voice. Taking voice as an example, however, the IMR server 122 may be configured with an IMR script for querying customers on their needs. For example, a contact center for a bank may tell customers, via the IMR script, to "press 1" if they wish to get an account balance. If this is the case, through continued interaction with the IMR server 122, customers may complete service without needing to speak with an agent. The IMR server 122 may also ask an open ended question such as, for example, "How can I help you?" and the customer may speak or otherwise enter a reason for contacting the contact center. The customer's response may then be used by the routing server 124 to route the call or communication to an appropriate contact center resource.

If the communication is to be routed to an agent, the communication server 122 interacts with a routing server 124 to find an appropriate agent for processing the interaction. The selection of an appropriate agent for routing an inbound interaction may be based, for example, on a routing strategy employed by the routing server 124, and further based on information about agent availability, skills, and other routing parameters provided, for example, by a statistics server 132.

In some embodiments, the routing server 124 may query a customer database, which stores information about existing clients, such as contact information, service level agreement (SLA) requirements, nature of previous customer contacts and actions taken by contact center to resolve any customer issues, and the like. The database may be, for example, Cassandra or any NoSQL database, and may be stored in a mass storage device 126. The database may also be a SQL database and may be managed by any database management system such as, for example, Oracle, IBM DB2, Microsoft SQL server, Microsoft Access, PostgreSQL, MySQL, FoxPro, and SQLite. The routing server 124 may query the customer information from the customer database via an ANI or any other information collected by the IMR server 122.

Once an appropriate agent is identified as being available to handle a communication, a connection may be made between the customer and an agent device 130*a*-130*c* (collectively referenced as 130) of the identified agent. Collected information about the customer and/or the customer's historical information may also be provided to the agent device for aiding the agent in better servicing the communication. In this regard, each agent device 130 may include a telephone adapted for regular telephone calls, VoIP calls, and the like. The agent device 130 may also include a computer for communicating with one or more servers of the contact center and performing data processing associated with contact center operations, and for interfacing with customers via voice and other multimedia communication mechanisms.

The contact center system may also include a multimedia/social media server 154 for engaging in media interactions other than voice interactions with the end user devices 108 and/or web servers 120. The media interactions may be related, for example, to email, vmail (voice mail through email), chat, voice video, text-messaging, web, social media, co-browsing, and the like. In this regard, the multimedia/social media server 154 may take the form of any IP router conventional in the art with specialized hardware and software for receiving, processing, and forwarding multi-media events.

The web servers 120 may include, for example, social interaction site hosts for a variety of known social interaction sites to which an end user may subscribe, such as, for example, Facebook, Twitter, and the like. In this regard, although in the embodiment of FIG. 1 the web servers 120 are depicted as being part of the contact center system, the web servers may also be provided by third parties and/or maintained outside of the contact center premise. The web servers may also provide web pages for the enterprise that is being supported by the contact center. End users may browse the web pages and get information about the enterprise's products and services. The web pages may also provide a mechanism for contacting the contact center, via, for example, web chat, voice call, email, web real time communication (WebRTC), or the like.

According to one exemplary embodiment of the invention, in addition to real-time interactions, deferrable (also referred to as back-office or offline) interactions/activities may also be routed to the contact center agents. Such deferrable activities may include, for example, responding to emails, responding to letters, attending training seminars, or any other activity that does not entail real time communication with a customer. In this regard, an interaction (iXn) server 156 interacts with the routing server 124 for selecting an appropriate agent to handle the activity. Once assigned to an agent, an activity may be pushed to the agent, or may appear in the agent's workbin 136*a*-136*c* (collectively referenced as 136) as a task to be completed by the agent. The agent's workbin may be implemented via any data structure conventional in the art, such as, for example, a linked list, array, and/or the like. The workbin 136 may be maintained, for example, in buffer memory of each agent device 130.

According to one exemplary embodiment of the invention, the mass storage device(s) 126 may store one or more databases relating to agent data (e.g. agent profiles, schedules, etc.), customer data (e.g. customer profiles), interaction data (e.g. details of each interaction with a customer, including reason for the interaction, disposition data, time on hold, handle time, etc.), and the like. The mass storage device may also store a floor plan of the physical contact center, and/or other physical characteristics and/or configuration of the contact center. According to one embodiment, some of the data (e.g. customer profile data) may be maintained in a customer relations management (CRM) database hosted in the mass storage device 126 or elsewhere. The mass storage device may take form of a hard disk or disk array as is conventional in the art.

According to some embodiments, the contact center system may include a universal contact server (UCS) 127, configured to retrieve information stored in the CRM database and direct information to be stored in the CRM database. The UCS 127 may also be configured to facilitate maintaining a history of customers' preferences and interaction history, and to capture and store data regarding comments from agents, customer communication history, and the like.

The contact center system may also include a reporting server 134 configured to generate reports from data aggregated by the statistics server 132. Such reports may include near real-time reports or historical reports concerning the state of resources, such as, for example, average waiting time, abandonment rate, agent occupancy, and the like. The reports may be generated automatically or in response to specific requests from a requestor (e.g. agent/administrator, contact center application, and/or the like).

The contact center system may also include an analytics server 158 that automatically processes interactions between the end users 106 and agents of the contact center to generate interaction data regarding the interactions, including the reason for the interaction, topics discussed during the interaction, customer sentiment, agent sentiment, interaction escalation rates, etc. The analytics server 158 may include a voice analytics component configured to recognize speech in voice or audio interactions between the end users 106 and the agents of the contact center in order to detect events in the voice or audio interactions. The analytics data generated by the analytics server 158 may be provided to the statistics server 132 and may be stored on the mass storage device 126 or elsewhere.

The contact center system may also include a workforce management server 160 (or workforce management system or employee engagement system or workforce optimization system) to generate work schedules for agents in accordance with expected interaction or call volumes and in accordance with agent skills (e.g., language or technical skills), scheduling information (e.g., agent starting, ending, and break times), or other information that may be useful to improve the efficacy of routing tasks. For example, in a contact center that operates 24 hours per day, a reduced call volume may be expected during the nighttime hours than the daytime hours, and therefore the staff size may be smaller. As another example, when a company releases a new product, technical support staffing may be increased to handle expected increased traffic from customers requesting help in setting up the new products.

The workforce management server 160 may also provide a user interface to allow a human supervisor or administrator to visualize and to generate agent work schedules in accordance with the agent data and expected demand. The workforce management server 160 may also provide a user interface for agents to, for example, submit preferences such as shift scheduling preferences, submit requests for time off (e.g., sick time and vacation time), and view assigned work schedules. The user interface may be, for example, web server software that provides a web interface to the workforce management server 160, an application programming interface (API) that allows access from a client program, or other known techniques for providing user interfaces to computer systems.

The various servers of FIG. 1 may each include one or more processors executing computer program instructions and interacting with other system components for performing the various functionalities described herein. The computer program instructions are stored in a memory implemented using a standard memory device, such as, for example, a random access memory (RAM). The computer program instructions may also be stored in other non-transitory computer readable media such as, for example, a CD-ROM, flash drive, or the like. Also, although the functionality of each of the servers is described as being provided by the particular server, a person of skill in the art should recognize that the functionality of various servers may be combined or integrated into a single server, or the functionality of a particular server may be distributed across one or more other servers without departing from the scope of the embodiments of the present invention.

In the various embodiments, the terms "interaction" and "communication" are used interchangeably, and generally refer to any real-time and non-real time interaction that uses any communication channel including, without limitation telephony calls (PSTN or VoIP calls), emails, vmails (voice mail through email), video, chat, screen-sharing, text messages, co-browsing (e.g., the customer and agent viewing the same web pages together, where an action taken by either the customer or the agent updates the views seen by both the customer and the agent), social media messages, web real-time communication (e.g., WebRTC calls), and the like.

Relating Key Performance Indicators to the Physical Arrangement of Agents and Resources of a Contact Center Generally, there is a desire to improve contact center efficiency and performance, which is generally measured in terms of metrics or key performance indicators (KPIs). Various studies have shown that various characteristics of physical environments can have an impact on worker performance, stress, and happiness. (See, e.g., Rachel Feintzeig, *The New Science of Who Sits Where at Work*, The Wall Street Journal, Oct. 8, 2013.) For example, some team members may prefer seats with more natural lighting, seats that are quieter and more secluded, or seats that are closer to break areas or restrooms. Some teams may make heavier use of some physical resources (such as printers) than other teams. In addition, the composition of a team can affect the performance, stress levels, and happiness of its members, and the performance of the team as a whole. Disruptive agents or neighbors can significantly hurt the productivity of nearby agents, while expert agents can often boost the productivity of their neighbors. Furthermore, the physical locations of particular team members who serve as resources, such as domain experts, with respect to the other team members, can also have an impact on the efficiency of the contact center. For example, if team members need to walk long distances or contorted paths to speak directly to the domain expert, this may decrease the efficiency of the team members. As such, the location of agents on the contact center floor, their locations with respect to their teammates or frequent conferees, and the compositions of the resource groups themselves (e.g., the agents and other resources assigned to a resource group), can have an impact on overall contact center performance.

In addition, some studies have suggested that incidental encounters between members of different departments or from different disciplines can result in increased productivity due to the cross-pollination of ideas. (See, e.g., Jonah Lehrer, *Groupthink—The brainstorming myth*, The New Yorker, Jan. 30, 2012.) As such, in some circumstances, arranging differing teams or resource groups to share common areas can increase the number of incidental internal encounters, thereby increasing the productivity of the separate teams or resource groups.

Aspects of embodiments of the present invention are related to the analysis of performance of individual agents and teams of agents of contact centers. The performance of the agents and the teams are analyzed in the context of the physical layout of the contact center and the logical resource groups that the agents are part of. In addition, aspects of embodiments of the present invention are directed to the automatic generation of suggestions relating to team composition, resource group composition, contact center floorplan, and physical arrangements of agents within the floorplan (e.g., agent workstation assignments). In addition, some aspects of embodiments of the present invention relate to the routing of interactions (e.g., calls) based on the current performance characteristics of the contact center, taking into account the physical layout of the contact center.

As such, various aspects embodiments of the present invention relate to a system and method for collecting data relating to contact center operations from a plurality of different sources, correlating the collected data, visualizing the correlated data, automatically analyzing the correlated data, and automatically generating recommendations and/or workforce schedules and assignments based on the analysis of the correlated data. The recommendations may relate to, for example, contact center floorplans, physical arrangements of teams and/or individual agents and resources, routing strategies for incoming interactions to the contact center, and alerts to physical circumstances within the contact center. In some embodiments of the present invention, these operations may be performed by one or more processors of the workforce management server 160 (e.g., in accordance with software or programs stored in the memory of the workforce management server).

Some embodiments of the present invention are directed to automatically routing incoming interactions to agents of the contact center by identifying one or more recipient agents in accordance with the performance characteristics of the agents, the working environments of the agents, and the skills required by the incoming interactions.

Data Collection

Some aspects of embodiments of the present invention are directed to the correlation of key performance indicators (KPIs) and metrics with characteristics of the working environments of agents in the physical contact center. The characteristics of the working environment may include, for example, the location of the agent within the contact center, the ambient air temperature at the agent's workstation, the background noise level at the agent's workstation, the physical distance between the agent and other members of the agent's team, distance to break areas, distance to walkways, artificial lighting brightness, window view, size of desk, the presence of cubicle walls, whether the workstation is a private office, and the like.

In one embodiment, the workforce management server 160 collects the KPIs from various sources, but embodiments of the present invention are not limited thereto. These KPIs may include, for example, agent utilization/occupancy (e.g., percentage of time involved in an interaction), agent idle time (e.g., amount of time that agents spend idle), average call handle time (e.g., average amount of time that a customer spends in an interaction with an agent), average hold time (e.g., average amount of time that customer spends on hold before starting an interaction with an agent), first call resolution rate, abandonment rate, agent attrition, net promoter score, agent adherence to workforce schedule, and the like, and can be retrieved from storage (e.g., stored on the mass storage device 126), and/or provided by the statistics server 132.

Other data that affects KPIs such as customer satisfaction and customer sentiment data (NPS score) can be obtained from customer survey results. After the completion of an interaction with an agent, these customer surveys may be presented to the end user by the IMR 122, by the web servers 120, by a text message, or by other net promoter score programs.

In addition, business results from interactions that also affect the KPIs can be retrieved from, for example, a customer relations management (CRM) database of the contact center (e.g., hosted on the mass storage device 126). For example, a KPI such as an agent's conversion rate may be determined based on whether a customer made a purchase or upgraded his or her services following an interaction with the agent.

According to some embodiments of the present invention, the analytics server 156 generates at least some of the performance metrics. One example of an analytics system is described in U.S. patent application Ser. No. 15/143,274 "Customer Experience Analytics," filed in the United States Patent and Trademark Office on Apr. 29, 2016, the entire disclosure of which is incorporated by reference. The analytics server 158 may also detect the mood, stress level, and satisfaction of the agent during the interaction based on the use of particular words or phrasings or based on the pitch, speed, and volume of the agent's voice. The mood, stress, and/or satisfaction of the agent may also be measured via a wearable device worn by the agent.

In some embodiments, the workforce management server 160 of the contact center stores information that can be combined with the performance metrics. For example, the workforce management server 160 may collect and store agent timecard information (e.g., clock-in and clock-out information), and use the timecard information to assist in scheduling agents. As one example, agent adherence to workforce schedule (e.g., on-time shift start percentages) can be tracked on a per-agent basis in order to estimate the likelihood that any given agent will start his or her shift on time, and the on-time shift start percentages of all of the agents of a shift can be used to predict what percentage of the agents will be ready to handle interactions at the start of a shift. As another example, agent shift schedules can be retrieved and correlated with performance metrics during each of those shifts.

Seating information regarding the location of each agent during each of the shifts can also be retrieved from contact center records, which may be stored on the mass storage device 126. Some contact centers may use a "fixed desk" or "assigned seating" approach in which each agent is assigned a permanent seat (or workstation). In some embodiments, the contact center may offer agent bidding, in which agents can express their preferences with regard to seating location (e.g., by submitting their preferences via the agent user interface of the workforce management server 160), and agents are assigned a seat (or workstation) based on a balancing of preferences against availability. As such, information about where each agent was sitting during each shift can be obtained, for example, from data regarding the agent's assigned seat (e.g., obtained from workforce management data).

Other contact centers may use an "open seating" or "hot seat" approach in which agents are free to choose and log in to any open workstation that they would like during their shift. In these circumstances, the location of the agent in the contact center can be inferred by matching the workstation that the agent is logged-in at with the physical location of that workstation (which may be known from the configuration of the contact center), where the workstation may be identified by, for example, an assigned workstation name, an IP address, or a MAC address. In some embodiments of the present invention, the location of the agent may be inferred using location services integrated into the workstation or the agent's mobile device (e.g., a mobile phone or a portable computer). These location services may identify a location based on, for example, global positioning system data and/or triangulation based on nearby wireless routers having known locations.

Physical characteristics of a contact center may be retrieved from the mass storage device 126 and/or obtained through a variety of other sources. For example, the ambient light level of in various parts of the contact center at various times of the day can be estimated from floorplans of the building, which may include both the location of windows and the location of light fixtures. In addition, real-time ambient light levels can be inferred from existing cameras such as security cameras and webcams integrated into workstations and mobile devices.

Noise levels at each workstation or location in the contact center can also be estimated from the floorplan based on, for example, the distance from the workstation to: other agents; busy walkways; break areas; conference rooms; restrooms; an elevator or stairwell; mechanical equipment; electronic equipment such as printers and copiers; and windows. In addition, in some circumstances, recordings of voice interactions can be used to infer the noise levels at an agent workstation, such as by measuring the amount of noise during portions of the recording of the agent's side of the conversation when agent is not speaking.

In some embodiments of the invention, electronic sensors distributed throughout the contact center may be used to collect information regarding background noise and daylight (e.g., using a microphone and a photodetector). These electronic sensors may also include other sensors for measuring conditions, such as a thermometer (e.g., a thermistor or thermocouple) for measuring the local temperature. In addition, in some embodiments, mobile devices of individual agents, such as smartphones, may also be used to provide sensor data about particular locations using, for example, cameras, microphones, and barometers integrated into the smartphones.

In some embodiments of the present invention, workstations may be classified or categorized in accordance with a security level. For example, workstations located in on an open floor with no partition between workstations may be classified as having a low security level whereas workstations with installed privacy screens may be classified as being slightly more secure, and workstations located in private offices may be classified as having a still higher security level. In addition, workstations having special security measures against the capture of sensitive data may also be classified as being more secure than workstations without security special measures. Such special security measures may include disabled USB ports, disabled outbound network connections, and disabled screenshotting capabilities.

An agent's social network within the contact center can also be inferred from logs regarding internal communications that is stored in the statistics server 132 and the mass storage device 126. For example, a junior agent may frequently confer with a more senior agent for advice in difficult situations. The junior agent may trigger these conferences by, for example, calling the senior agent after putting the customer on hold, conferencing the senior agent with the customer, or sending an out-of-band message (e.g., a text chat or instant or direct message) to the senior agent requesting assistance. In addition, in some circumstances, the junior agent may also put the customer on hold and walk to the senior agent's workstation to ask for advice, or meet with the senior agent in a conference room. In this regard, information from logs stored in the mass storage device 126 can be used to infer the social networks of the agents by measuring which agents frequently confer with one another (e.g., identifying, for each agent, frequent conferee agents), through instant messaging, and through forwarding, transferring, and conferencing the interactions.

An agent's usage of physical resources within the contact center can also be measured based on workstation activity. For example, logs retrieved from a networked printer or networked print server can identify which agents printed to the printer or print server and how frequently those print jobs were sent. As another example, pedometer data may be used to identify how far the agents walk when they leave their desks (e.g., to use shared resources in the contact center such as break rooms, printers, and restrooms). As still another example, the frequency with which agents leave the building can be tracked based on the building security system (e.g., to identify agents who frequently go outdoors during their breaks).

Individual agents can submit information about their preferences for their physical work environments via the workforce management server 160 through the agent user interface or by surveys sent to the agents. For example, the agents may identify whether or not they prefer brightly lit workspaces; warmer workspaces; quieter workspaces; easy access to break rooms; easy access to elevators, and the like. For example, a question may ask, "do you usually take breaks at your desk, outside, or in the break room?" Surveys may also identify preferences regarding proximity to other team members and/or proximity to particular supervisors. In addition, in a contact center using a hot seat approach, a workforce management server 160 can infer agent preferences based on characteristics of workstations that are frequently chosen by those agents.

In some embodiments, the workforce management server 160 is configured to combine individual metrics to generate compound metrics. For example, a "conversions per agent-hour" rate could be used to compare the effectiveness of different teams of sales agents. Furthermore, the metrics can be normalized (or inverted) to fall within similar ranges (or so that larger values are consistently relate to better performance) so that they can be more easily correlated and compared with one another.

Contact Center KPI/Social Network Visualization and Data Correlation

According to one embodiment, collected data may be correlated to agent location/placement on the contact center floor, and visual indicators provided on a user interface for readily conveying to a viewer (e.g., a supervisor) aspects of the correlated data. For example, aspects of embodiments of the present invention are directed to generating visualizations of data (e.g., KPIs) regarding the contact center operations, as overlaid on a physical map of the contact center floor, such as by showing "heat maps" of the data. The visualizations of the KPIs may include representations of historical information (e.g., tracking KPIs over a period of weeks, months, days, hours, or minutes), a live view of current KPIs (e.g., continually updated metrics from events over the past sixty minutes, thirty minutes, fifteen minutes, etc.), or may be predictive (e.g., a prediction of future KPIs based on statistical models of agents and/or customers).

Figure 2A:
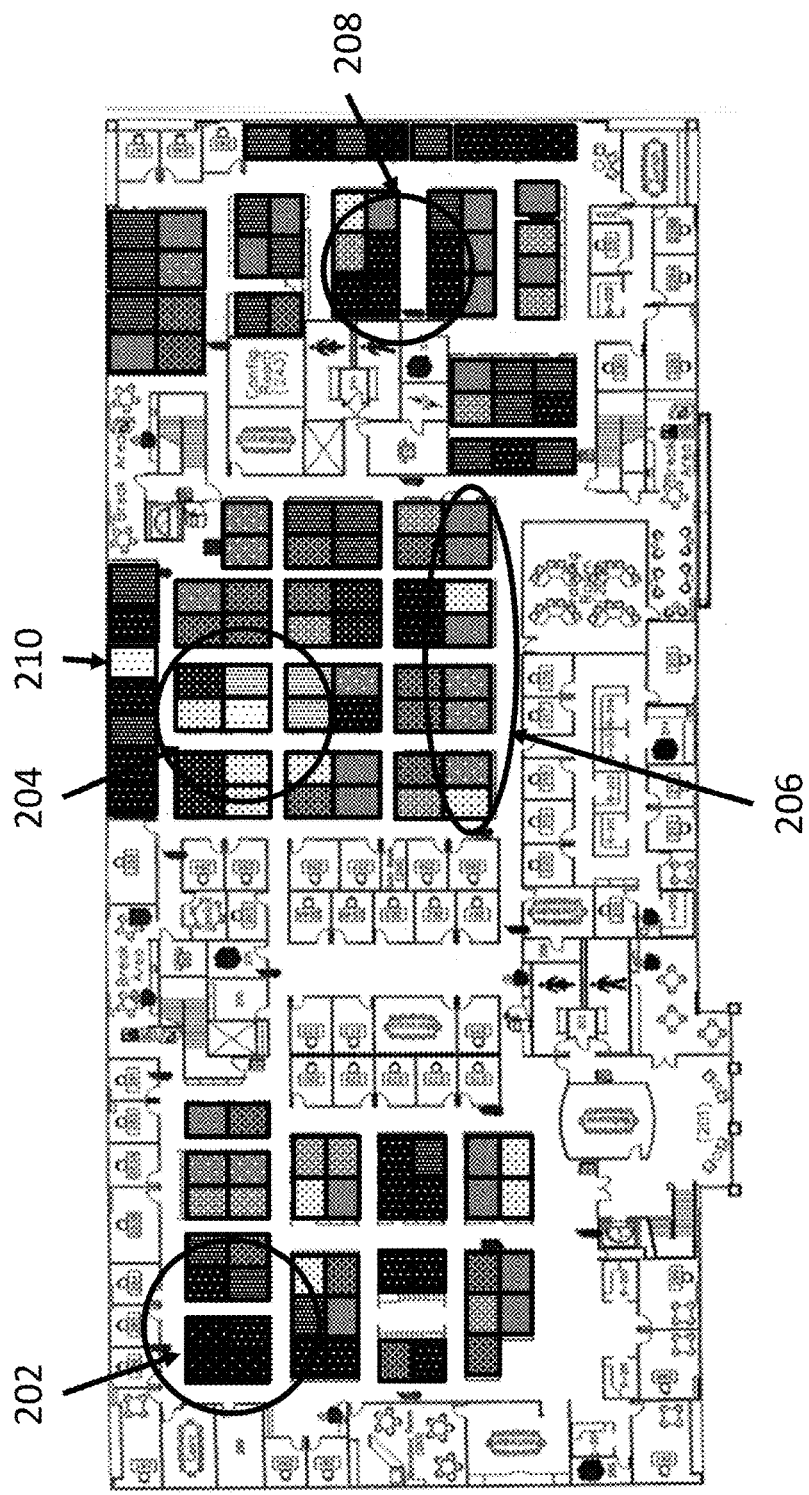
FIG. 2A is an example of a key performance indicator heat map according to one embodiment of the present invention.

FIG. 2A is an example of a heat map showing key performance indicators or metrics according to one embodiment of the present invention. Referring to FIG. 2A, shading indicates the value of the data being shown (e.g., darker shaded portions corresponding to higher values and lighter shaded squares corresponding to lower values). Embodiments of the present invention are not limited to using shading to indicate data values. For example, in some embodiments, different colors may be used to indicate the values of the KPIs (e.g., red to show higher values, blue to show lower values, and combinations of red and blue to show intermediate values).

As seen in FIG. 2A, an administrator may be able to hypothesize as to causes of unusual performance characteristics or performance characteristics that deviate from typical characteristics based on the visualization of the metrics on the floor map. For example, agents in the region 202 in the upper left corner are shaded darker to indicate that their performance metrics are better (e.g., higher). This may be due to their proximity to the corner office, which may encourage the agents to be more focused on their work in front of their boss. As another example, agents in the region 204 are shaded more lightly, which may indicate lower performance. This may be due to a localized problem such as a broken air vent or may be due to the disruptive or distracting behavior of an agent in the region 204. Agents in region 206 are shaded more lightly, and may have lower than average performance due to their proximity to a busy walkway (e.g., the walkway from the lobby to the work area. Agents in region 208 are shaded darker, and may have higher productivity due to the more isolated location on the contact center floor. The agent at location 210 has light shading, and may be underperforming relative to the agent's neighbors because the neighbors enjoy the sunlight from the window, while the agent at location 210 might be more productive at a more dimly lit workstation. Alternatively, or in addition, the performance of the agent at location 210 may be worse due to other factors such as the nature of the assigned activity, the team composition, or a very localized problem (e.g., an unpleasant neighbor).

Figure 2B:
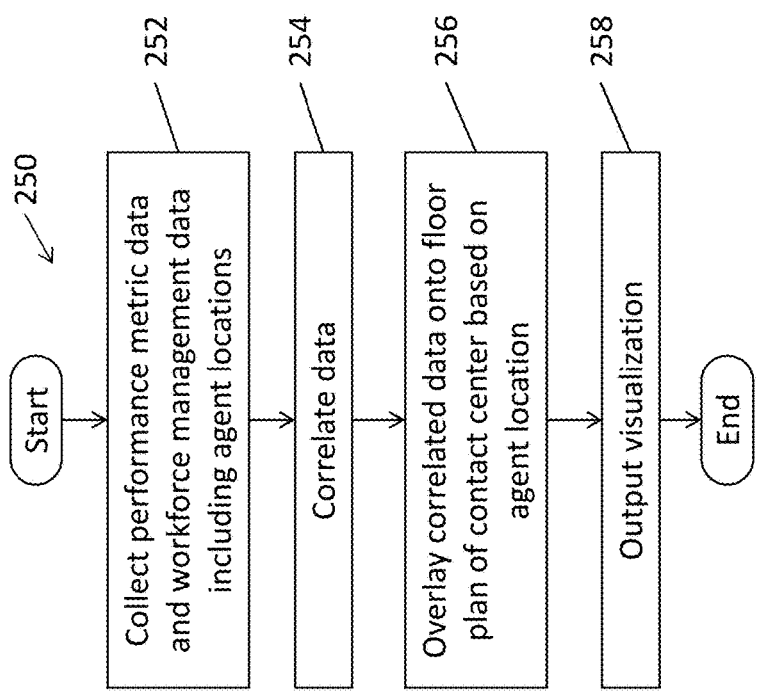
FIG. 2B is a flowchart of a method for generating a heat map according to one embodiment of the present invention.

FIG. 2B is a flowchart of a method 250 for generating a heat map according to one embodiment of the present invention. Referring to FIG. 2B, in operation 252, the workforce management server 160 collects data from multiple applications in the contact center. These applications may include, for example, the mass storage device 126, the statistics server 132, and the analytics server 158, which may store performance metrics calculated or measured from agent performance. The workforce management server 160 may also collect workforce management data such as the working hours (e.g., shift) and location of the agent within the contact center from the workforce management server 160.

In operation 254, the workforce management server 160 combines and correlates the data collected in operation 252 associated with an agent. For example, performance metric data associated with a particular agent from the various sources can be combined with the workforce management data relating to that same agent (e.g., based on an agent identifier or Agent ID). The workforce management server 160 may then correlate the combined data using statistical analysis. For example, data regarding the background noise levels at various locations of the contact center can be combined with KPIs of agents at those various locations in order to determine whether the background noise in the contact center has an impact on productivity (e.g., higher background noise may be correlated with lower performance and/or higher agent stress).

In some embodiments of the present invention, the workforce management server 160 automatically applies regression techniques to the collected data to identify statistically correlated parameters in the data that may merit further analysis by a human supervisor. For example, embodiments of the present invention may automatically identify correlated pairings or groupings of performance metrics and physical characteristics of the contact center. As a more specific example, the workforce management server 160 may automatically identify a correlation between average handle time and background noise levels (e.g., average handle time is shorter when background noise levels are lower). As such, this combination of data is a candidate for a visualization that displays background noise levels across the contact center on the map of the contact center along with average handle time for agents located at each workstation. This allows a supervisor to identify potentially higher productivity and lower productivity locations or workstations in accordance with the amount of background noise at that location.

In operation 256, a representation of the correlated and combined data is overlaid onto a floorplan of the contact center based on the agent locations retrieved from the workforce management server 160. In some embodiments, these physical characteristics are represented using overlays of a different shade or color or as a combined metric, such as by combining a noise level with a performance metric.

In various embodiments of the present invention, the data displayed in the visualization can correspond to a variety of different time intervals. For example, the key performance metrics displayed can correspond to average or cumulative values for data collected over a period such as a year, a month, a week, a day, or an hour. In some embodiments, the data may be updated substantially in real time (e.g., updated on the fly as data is collected by the statistics server 132, the analytics server 158, etc.). In some embodiments, the workforce management server 160 aggregates metrics over corresponding slices of time. For example, the workforce management server 160 may aggregate performance data for a set of Mondays over the course of the year as one data set, and aggregate performance metrics for a set of Fridays over the same year as a second data set, in order to compare performance on Mondays with performance on Fridays.

Some embodiments of the present invention retrieve and display historical data to allow a supervisor to compare performance before and after a significant event (e.g., a change in the layout of the contact center floorplan, a change in schedule, and a reorganization of working teams). In some embodiments, the workforce management server 160 generates a visualization of the change of values of a metric over time (e.g., the metrics over the course of a day) by animating the display of the historical contact center data (e.g., displaying the day of metrics over the course of a minute).

In some embodiments of the present invention, the workforce management server 160 filters the metric data based on the agent skills. For example, one visualization may limit key performance metric data to data collected during simple interactions (e.g., assisting a customer in updating the mailing address), while another visualization may display collected during complex interaction (e.g., assisting a customer in a processing an insurance claim involving many parties).

In operation 258, the workforce management server 160 outputs the generated visualization for display, e.g., on a terminal (e.g., in a web browser of a desktop computer, a laptop computer, a smartphone, a tablet, and the like), e.g., by generating a data object (e.g., a JavaScript Object Notation or JSON data, an XML document, or by generating a web page).

Aspects of embodiments of the present invention are also directed to generating visualizations of agent social networks and frequent communication paths overlaid onto contact center floorplans. For example, in one embodiment, the visualization is a graph showing agents as vertices and relationships between those agents as directed or undirected edges. These visualizations can provide information regarding the physical flow of a customer interaction through the contact center.

Figure 3A:
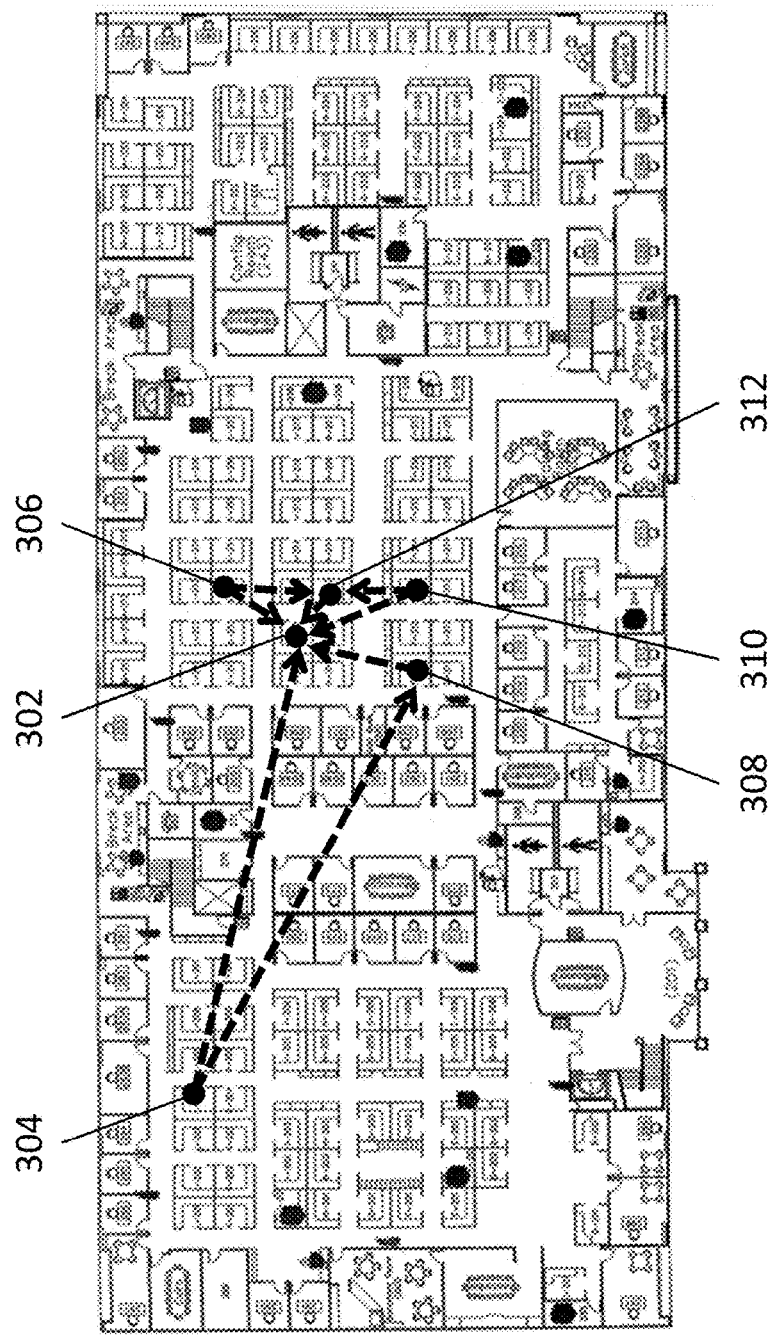
FIG. 3A is a diagram generated in accordance with one embodiment of the present invention of one agent social network overlaid on a floorplan.

FIG. 3A is a diagram generated in accordance with one embodiment of the present invention of one agent social network overlaid on a floorplan. As discussed above, the workforce management server 160 can infer social networks of the agent from the collected data such as logs regarding calls, chats, and other interactions within the contact center. The social networks identified by the automatic analysis of the internal interaction logs can reveal information about ad-hoc and informal internal team structures beyond that of the teams formally assigned by the organization. These relationships may include, for example, mentoring relationships, sources of knowledge and/or expertise among the agents, and friendships.

FIG. 3A shows an overlay of one social network among agents 302, 304, 306, 308, 310, and 312 according to one embodiment of the present invention. As shown by the dashed arrows in FIG. 3A, agents 304, 306, 308, 310, and 312 all frequently consult with agent 302 (e.g., agent 302 may be a manager). Agents 306 and 310 may also frequently consult with agent 312. Furthermore, agent 304 may also frequently consult with agent 308.

As shown in FIG. 3A, agents 302, 306, 308, 310, and 312 are all located relatively close to one another and in the same portion of the contact center, while agent 304 is more distant from the other agents and is separated from the other agents who confer with agent 302 by a group of private offices. Therefore, social network visualizations can identify the relative locations of team members to one another within the contact center. In some circumstances, it may be beneficial if team members are physically located close to one another. In the example shown in FIG. 3A, it may be beneficial for agent 304 to use a workstation closer to the other agents in the team, including agents 302 and 308. However, without this visualization, it may have been more difficult for a supervisor to recognize the physical distance between agent 304 and the rest of the team.

Figure 3B:
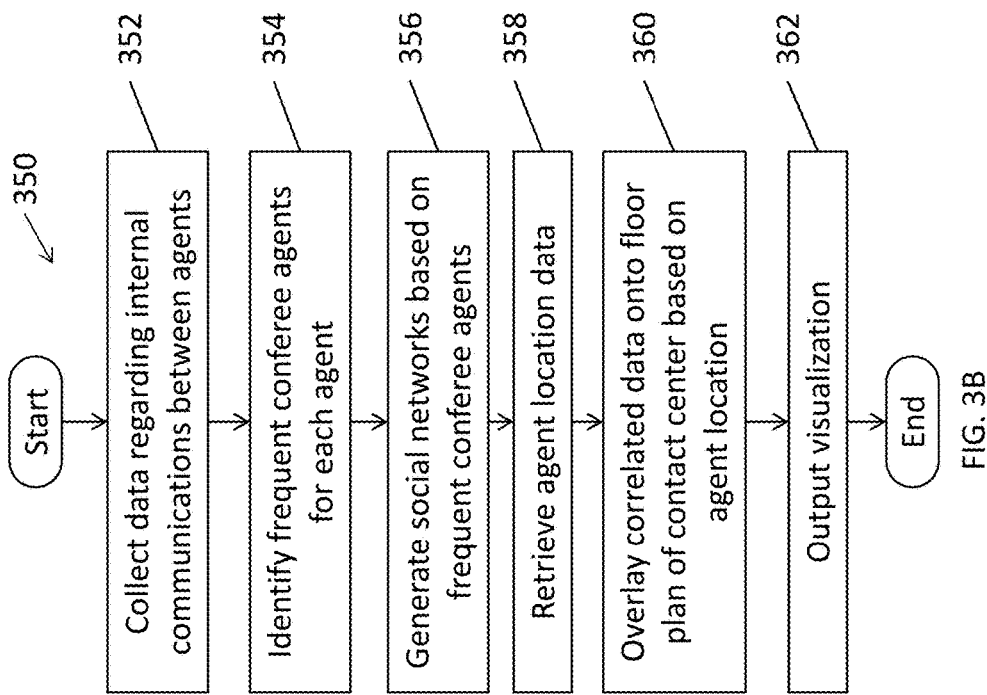
FIG. 3B is a flowchart of a method for generating a visualization of agent social networks overlaid on a floorplan according to one embodiment of the present invention.

FIG. 3B is a flowchart of a method 350 for generating a visualization of agent social networks overlaid on a floorplan according to one embodiment of the present invention. Referring to FIG. 3B, in operation 352, the workforce management server 160 collects data regarding internal communications between agents within a contact center (e.g., interaction forwarding, interaction conferencing, and text message). Such data may be retrieved, for example, from the mass storage device 126.

In operation 354, the workforce management server 160 identifies, for each agent of the contact center, one or more frequent conferee agents. In operation 356, the workforce management server 160 generates a plurality of social networks of the agents in accordance with the identified one or more frequent conferee agents. For example, if agent A frequently engages in internal communications with agents B and C (e.g., A frequently chats with agents B and C or forwards interactions to B and C or conferences B or C into calls), then agents B and C would be among agent A's frequent conferee agents. In operation 358, the workforce management server 160 retrieves the locations of the agents within the contact center. As discussed above, these data may be stored, by the workforce management server 160 based on assigned physical arrangements of agents, or may be computed based on the known location of the workstation that the agent is logged in to.

In operation 360, the workforce management server 160 overlays at least one of the generated social networks of the agents onto a floorplan of the contact center in accordance with the locations of agents of the social network to generate the visualization of the social networks of the agents of the contact center (see, e.g., FIG. 3A), and, in operation 362, the workforce management server 160 outputs the generated visualization for display on a device (e.g., a desktop computer, a laptop computer, a smartphone, a tablet, and the like). As such, embodiments of the present invention can also provide a visualization of typical interaction flow through the physical contact center floor.

Figure 4A:
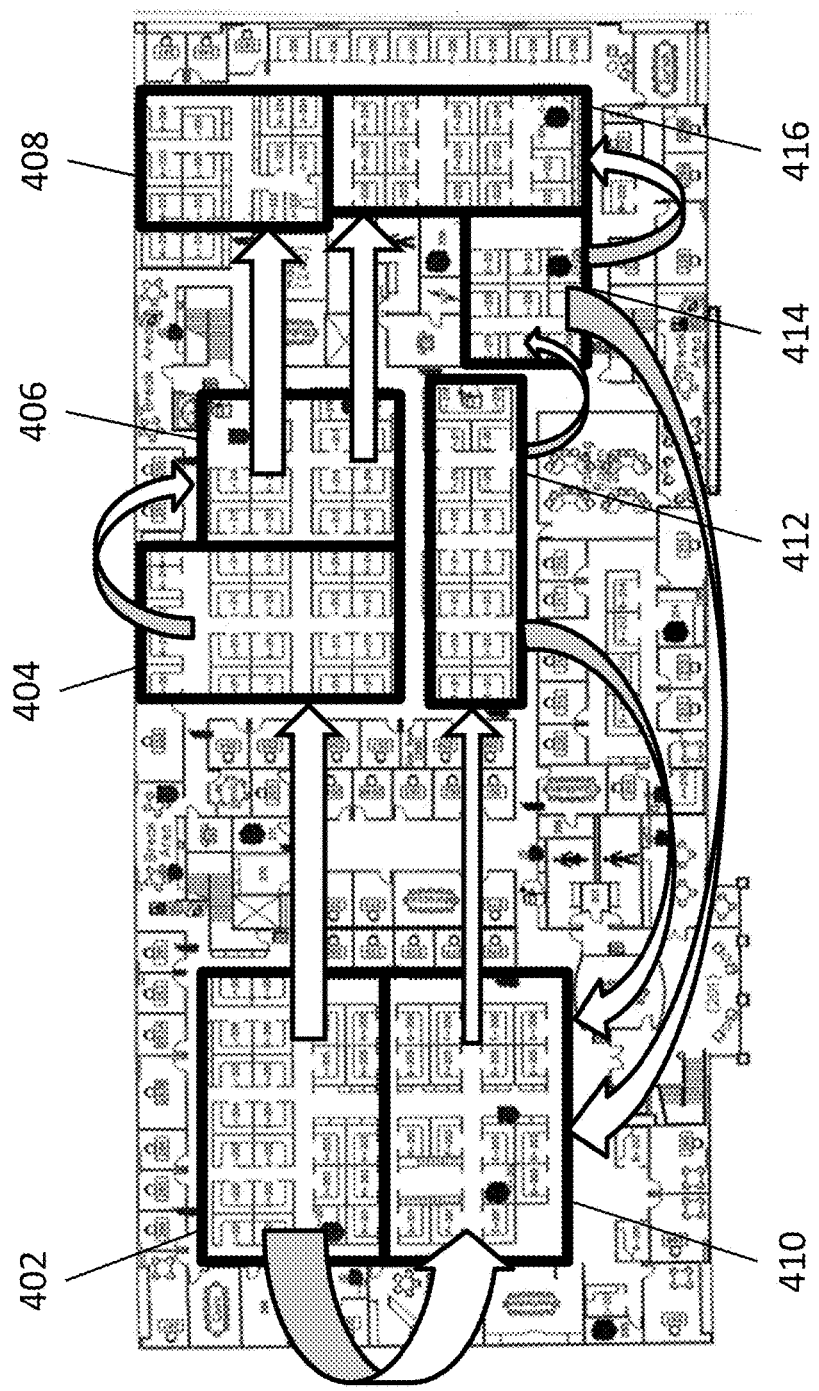
FIG. 4A is a diagram according to one embodiment of the present invention of the locations of different teams spread throughout a floor of a contact center and a visualization of interaction flows through the contact center.

FIG. 4A is a diagram according to one embodiment of the present invention of the locations of different teams spread throughout a floor of a contact center, and a visualization of interaction flows through the contact center. As shown in FIG. 4A, dark rectangles outline different portions of the contact center floor to show the locations of different departments. For example, in the context of a call center for a cable television and internet access provider, the sales department may be located in portion 402 of the contact center floor, and the service scheduling department may be located in portion 410 of the contact center floor. The block arrows between different portions of the contact center floor show the volume of interactions that are transferred from one department to another. Continuing the above example, the arrow from portion 402 to portion 404 may correspond to transferring interactions from sales to customer service to answer particular questions about the service. The wide arrow from portion 402 to portion 410 may correspond to the large number of interactions that are transferred from sales department 402 to service department 410, due to successful sales calls requiring the scheduling of a technician to install the cable service at the customer's premises.

As another example, department 412 may correspond to a technical support department, where some set of interactions are routed to the service department 410 for scheduling technician service of customer equipment, and some set of interactions are routed to department 414 (e.g., second tier technical support). Department 416 may correspond to the customer retention department, and may receive incoming interactions from the second tier technical support department 414 and the billing department 406. The billing department 406 may also transfer some portion of its interactions to the collections department 408.

Figure 4B:
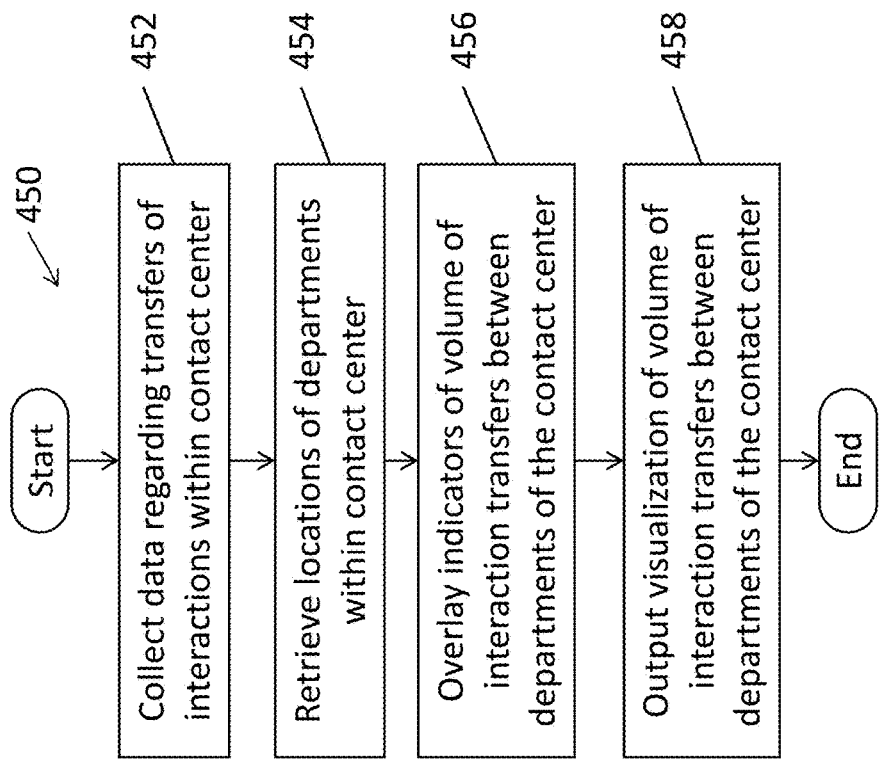
FIG. 4B is a flowchart of a method for generating a visualization of interaction flows through the contact center according to one embodiment of the present invention.

FIG. 4B is a flowchart of a method 450 for generating a visualization of interaction flows through the contact center according to one embodiment of the present invention. In operation 452, the workforce management server 160 collects data regarding transfers of interactions between a plurality of departments of the contact center (in some embodiments, this information regarding transfers may be retrieved from the reporting server 134). As discussed above, these data may be retrieved from call logs stored in the mass storage device 126 and/or the stat server 132. The workforce management server 160 then retrieves, in operation 454 locations of the departments of the contact center. These data may be determined based on information stored in the workforce management server 160 regarding known locations of members of various departments, or may be manually entered in accordance with the known floorplan and design of the contact center. In operation 456, the workforce management server 160 overlays a plurality of indicators of volumes of interaction transfers between departments of the contact center to generate the visualization. As shown in FIG. 4A, in one embodiment, the volume of transfers is indicated based on the size (e.g., width) of an arrow connecting two departments. However, embodiments of the present invention are not limited thereto and other techniques may be used to indicate the volume of interaction transfer, such as color and shading. In operation 458, the workforce management server 160 outputs the visualization of the indicators overlaid onto the floorplan of the contact center.

As such, embodiments of the present invention can be used to visualize the flow of interactions through the contact center, which can provide insight into whether the floorplan of the contact center can be reorganized to bring frequently communicating departments physically closer together (e.g., to encourage additional incidental internal encounters in common areas such as break rooms). In addition, some embodiments of the present invention relate to the visualization of KPIs across the contact center as overlaid on a floorplan of the contact center, thereby allowing the detection of, for example, outlier agents who may benefit from assignment to a different physical location, areas with a distracting environment (e.g., due to noise or temperature), and physical areas of the contact center having unusually high performance or unusually low performance.

Agent Modeling

According to one embodiment, data collected by the workforce management server 160 may be used to generate and to update agent models. Given that various agents of the contact center may have different performance levels on different types of tasks in accordance with the physical characteristics of their working environments and based on the agents' assigned resource groups, each of the agent models may include one or more predictors that are used to predict agent performance (e.g., an agent's performance metrics) based on a particular set of working conditions. In one embodiment, a predictor for an agent is a function that takes a collection of working conditions as input and returns a predicted performance metric for that agent as an output.

Examples of systems and methods for modeling agents are described in U.S. patent application Ser. No. 15/143,274 entitled "Customer Experience Analytics," filed in the United States Patent and Trademark Office on Apr. 29, 2016, the entire disclosure of which is incorporated by reference. The agent models may be individual models (e.g., individualized to particular agents) or may be aggregated, e.g., on a team-by-team basis, on a schedule basis, and on general characteristics such as "morning person," "enjoys warm workstations," and "easily distracted."

Figure 5:
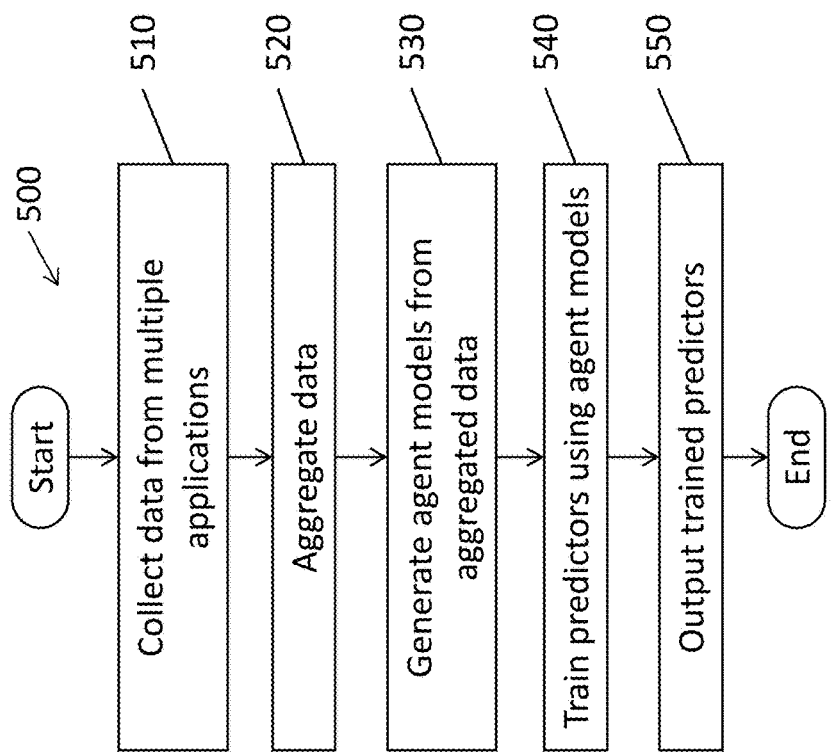
FIG. 5 is a flowchart of a method for generating an agent model based on collected data according to one embodiment of the present invention.

FIG. 5 is a flowchart of a method 500 for generating a model of an agent according based on collected data according to one embodiment of the present invention. According to one embodiment, the workforce management server 160 performs the method described herein, but embodiments of the present invention are not limited thereto and the method of generating the model of the agent may be performed by other systems (e.g., other computer systems) which may or may not be components of the contact center.

In operation 510, in one embodiment the workforce management server 160 collects data collected from multiple applications. These multiple applications may include, for example, the mass storage device 126, the statistics server 132, the analytics server 158, the workforce management server 160, and/or the like. These collected data may include, for example, working environment data and key performance metric data. The working environment data may include data regarding the physical environment around the agent, such as the location of the agent within the contact center, ambient air temperature at the agent's workstation, background noise level at the agent's workstation, distance to walkways, distances to resources (e.g., the supervisor's office, subject matter experts, break areas, restrooms, the entrance, stairwells, shared hardware such as printers, and the like).

In addition, aspects of embodiments of the present invention are directed to systems and methods for identifying relationships between agents, for assigning agents to teams, and for generating work schedules in order to improve or optimize performance of a contact center. In view of this, the working environment data may also include social network information including, for example, the composition of the agent's team (such as the number of junior versus senior members), which agents are near or adjacent the current agent, and the distances between the agent and members of agent's social network (including fellow team members, knowledge sources, mentors, and supervisors).

In operation 520, in one embodiment, the workforce management server aggregates the collected data. This aggregation operation may include, for example, converting the data from the native formats of the individual applications to an internal format of the workforce management server 160 (e.g., using a data format conversion module tailored for each application), normalizing the units of the various data to a standard set of units (e.g., normalizing data to events per minute, where the original data may have been stored as events per day or minutes per event), normalizing the data to similar ranges (e.g., a value from 0 to 100 or a value from 0 to 255), accumulating or averaging values, associating conditions with timestamps (e.g., determining the ambient temperature around the agent when a particular metric was measured based on the agent's location at the time of the event and the measured temperature in the contact center at the time).

In operation 530, the workforce management server 160 generates training data from the collected data. The training data may also be referred to as the agent models. This process may include, for example, identifying data values associated with an agent and relating to one of the key performance indicator metrics to predict (e.g., agent utilization, agent occupancy, agent attrition, average handle time, first call resolution rate, abandonment rate, net promoter score, conversion rate, agent adherence to workforce schedule, and the like), and identifying data values relating to a plurality of working condition parameters (e.g., ambient air temperature, skill being utilized, complexity of task, number of hours into shift, background noise level, distance to team members, which other agents are part of the agent's team, expertise levels of the team, and the like). In addition, workforce management data and historical performance of agents at different times of the day are also included in the working condition parameters. The model may also account for lower performance due to recent changes such as the agent's level of experience in the current role (e.g., the agent point in the learning curve for the role), and recent changes to agent's working environment (e.g., physical location or assignment to a resource group), and may also account for expected changes in performance due to the development of the agent's skills (progression along the learning curve) or the agent's increasing comfort with a working environment (e.g., new resource group including new coworkers). The identified key performance indicator metrics correspond to the target output of the predictor, and the condition parameters correspond to features generated from the observations.

The agent models may be aggregations of agent data for each of the agents. For example, each agent may be associated with a unique agent identifier (or agent ID) and every interaction associated with that agent ID may be aggregated into the agent model for a particular agent. In this regard, the agent model contains sufficient historical information to compute, for example, the agent's first call resolution rate, hold time, handle time, sales performance, customer satisfaction scores, and other performance metrics. Furthermore, these performance metrics may be computed based on various conditions such as the interaction topic and/or classes of customers.

Similarly, in some embodiments of the present invention, in operation 530 the workforce management server 160 may also compute aggregated agent models from the individual agent models by aggregating the performance metrics of the various agents across various groups of agents. The aggregation may be computed by, for example calculating mean performance metrics across the agents within the group (e.g., the mean first call resolution time of the group). The groups may be defined along a plurality of different dimensions, thereby resulting in a plurality of different aggregated agent models. The aggregation dimensions may include, for example, the shift (e.g., day or night), resource group assignment, department (e.g., sales versus customer service), and the like.

In operation 540, the workforce management server 160 may generate a set of predictors based on the generated agent models, where the predictors may be used to predict agent performance in terms of agent performance metrics based the agent's working environment and/or assigned resource group.

In some embodiments, the predictors correspond to regression models (e.g., linear and/or logistic regression models) relating the working environment parameters such as the physical characteristics of a location and scheduling as independent variables, to expected agent performance characteristics as the dependent variable. In some embodiments, the workforce management server 160 uses multiple models for each agent, where each model predicts a different performance characteristic of the agent.

In some embodiments, the predictors correspond to neural networks and/or deep neural networks (a deep neural network being a neural network that has more than one hidden layer, for use with deep learning techniques), and the process of generating the predictors may involve training the deep neural networks using the generated agent models. In this regard, the predictors compute the expected value of an agent's performance metric based on the working environment parameters that are supplied as inputs to the predictor. As such, the agent model may be thought of as containing a list or set of features (e.g., a feature vector) corresponding to the working environment (e.g., background noise level, temperature, time of day, brightness of workstation, and the like) and one or more of the features may be supplied as input features to the predictor, where the predictor predicts the agent's performance given the features (e.g., predicts the agent's average handle time given the features). A predictor may be trained for each agent or for each group of agents. The training of the neural network predictors may be performed, for example, using a back propagation algorithm.

In operation 550, the workforce management server 160 may output the trained predictors (e.g., a plurality of parameters defining the predictors, such as a plurality of weights) to be stored on the workforce management server 160 or to be stored in the mass storage device 126. For example, the trained predictors may include a set of weights for each of the parameters of a linear regression model, or the trained predictors may include a set of weights for connections between the neurons of a trained neural network.

Agent and Resource Location Optimization

In some embodiments of the present invention, the predictors generated based on the collected information stored in the agent models may be used to predict the performance of each agent at any given location on the contact center floor on any given day.

The methods of using the predictors may depend on the type of predictor used. For example, when the predictor is a linear regression model, and when a prediction is to be made regarding the performance of an agent in a particular metric in a particular location on the contact center floor and assigned to a particular resource group, then the linear regression model corresponding to the predictor of the particular metric is loaded (e.g., the weights of the parameters of are loaded, and the characteristics of the physical environment of the location and the characteristics of the resource group of the agent are multiplied by their corresponding weights (e.g., a parameter for temperature may be a value from 0 to 1 and may be multiplied by its corresponding weight). The resulting products are then added together to generate a prediction of the agent's performance on the particular metric, given the input conditions.

As another example, when the predictor is a neural network, then the weights of the connections of the neural network corresponding to the predictor for the agent are loaded and applied to a neural network. The characteristics of the physical environment of the location and the characteristics of the resource group are supplied as values to the input layer of the neural network, and the values are forward propagated through the neural network to generate an output, where the output corresponds to a prediction of the agent's performance on the particular metric, given the input conditions.

These individual predictions can be used to generate a prediction of the overall performance of an agent work schedule and a physical arrangement of agents and resources in the contact center, where the physical arrangement may include an agent physical arrangement. Suggested floorplans and physical arrangements may then be automatically generated to improve or optimize performance of a contact center.

Figure 6A:
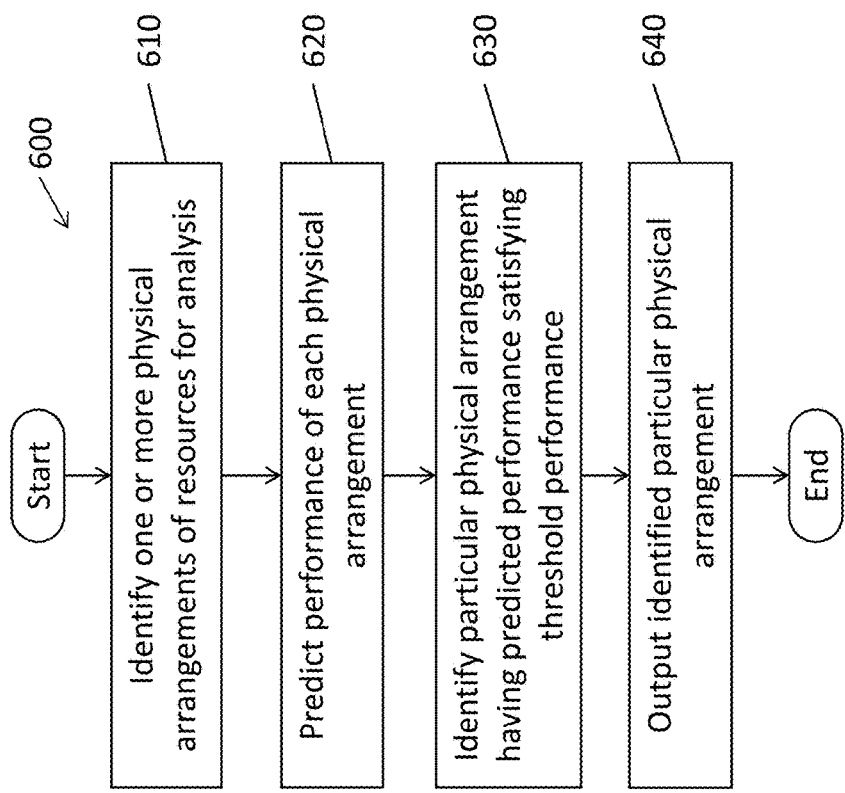
FIG. 6A is a flowchart of a method for generating agent physical arrangements based on collected data according to one embodiment of the present invention.

FIG. 6A is a flowchart of a method 600 for generating agent physical arrangements based on collected data according to one embodiment of the present invention.

TABLE 1

| Agent name | Agent ID | Seat |
| --- | --- | --- |
| Doyle, Jayne | 4098 | C201 |
| Nicolas, Rollin | 6225 | C302 |
| Koepp, Garrett | 3611 | C203 |
| Sawayn, Zachary | 3073 | C304 |
| Buckridge, Jeannie | 8623 | C205 |
| Erdman, Zelia | 6762 | D201 |

TABLE 1-continued

| Agent name | Agent ID | Seat |
|---|---|---|
| Prosacco, Kirsten | 5165 | D302 |
| Koepp, Rasheed | 3406 | D203 |
| Leffler, Dyan | 8723 | D304 |
| Effertz, Aloma | 6545 | D205 |

According to one embodiment of the present invention, in operation 610, the workforce management server 160 identifies one or more physical arrangements for analysis. In one embodiment, the potential physical arrangements may be manually supplied, generated by a human supervisor, or generated by an algorithm in accordance with the agent seating preferences (e.g., agent bids for particular seats or workstations) supplied to the workforce management server 160 via the agent user interface or via surveys. In one embodiment, all possible physical arrangements are considered. In one embodiment, the potential physical arrangements are automatically generated by making small changes (or perturbations) of a current physical arrangement, where the perturbations may relate to relocating outlier agents (e.g., agents who appear to have significantly different performance characteristics than their neighbors, such as the agent located at location 210 in FIG. 2A). In one embodiment, the small changes include relocating or adding additional shared resources such as printers, stockrooms, break areas, water coolers, subject matter experts, and the like.

In one embodiment, the workforce management server 160 identifies high performing agents and/or teams of agents (e.g., having performance higher than average), and generates physical arrangements and locations of shared resources to mimic the physical arrangements and working environments of the high performing agents and teams. In one embodiment, the workforce management server 160 generates all possible arrangements of agents scheduled to work during a particular shift. In one embodiment, the workforce management server 160 generates all possible arrangements of agents that could work during any shift, and may generate sets of physical arrangements, each set of physical arrangements corresponding to a different working shift (e.g., early, late, and night shifts). Table 1 is an example of a portion of a physical arrangement automatically generated according to one embodiment of the present invention.

In one embodiment, in operation 620 the workforce management server 160 predicts the performance of each physical arrangement of resources by predicting the performance of each agent in the physical arrangement in the working environment imposed by the physical arrangement. For example, when evaluating the performance of the physical arrangement shown in Table 1, working environment parameters for "Seat C201" can be loaded from the collected data (e.g., background noise level, ambient air temperature, light exposure, and the like) and supplied to the predictor for agent 4098 "Doyle, Jayne." As noted above, the working environment parameters also include aspects relating to other agents such as the distance to other team members or proximity to disruptive agents, and proximity to shared equipment. In the above example, the effects of having agent 6225 "Nicolas, Rollin" sitting next to agent 4098 "Doyle, Jane" may also be a component of the predictor. As another example, agent 8623 "Buckridge, Jeannie" may be an expert in a particular domain and the proximity of agent 8623 to agent 4098 "Doyle, Jayne" may improve her productivity. In addition, workforce management data and historical performance of agents at different times of the day are also used to predict agent performance.

According to one embodiment, the predictor generates a predicted metric for the agent at the location specified by the physical arrangement (e.g., predicting the agent's average handle time when seated at that location). The workforce management server 160 then aggregates the predictions for all of the agents (e.g., computes an average or a sum of the metrics) to generate a predicted performance of the physical arrangement.

In operation 630, the workforce management server 160 identifies a particular physical arrangement among the physical arrangements identified in operation 610, as the physical arrangement having a predicted performance satisfying a threshold performance. For example, the predictor may predict an average handle time for the group agents in each identified physical arrangement in operation 620. As such, operation 630 identifies physical arrangements having average handle time satisfying a threshold average handle time (e.g., a predicted average handle time lower than a threshold average handle time). In some instances, multiple physical arrangements will have the same or substantially the same predicted performance and, therefore, in some embodiments, tiebreak mechanisms may be used to identify one particular satisfying physical arrangement (e.g., a physical arrangement that minimizes the changes from an existing arrangement). In other embodiments of the present invention multiple physical arrangements may be output.

In operation 640, the workforce management server 160 outputs the identified particular physical arrangement satisfying the threshold performance level or may output multiple physical arrangements satisfying the threshold performance level. In one embodiment, the workforce management server 160 outputs a list of resources (e.g., agents and equipment) and their corresponding locations within the contact center (e.g., based on assigned office or cubicle numbers, or based on a coordinate system).

In some embodiments of the present invention, experimental physical arrangements may be used to collect data on the performance of particular agents in unknown circumstances. For example, information about the effect of additional lighting on some agents may be unavailable because those agents have always sat in dark locations. As such, some embodiments of the present invention are directed to automatically generating physical arrangements to test the effects of a different working environment on particular agents of the contact center and to collect additional data for generating more accurate agent models.

As such, embodiments of the present invention are directed to the automatic generation of physical arrangements of agents and resources across a contact center in order to improve overall performance of the contact center. These arrangements are computed through the collection and correlation of performance data across teams of agents working at the contact center across different shifts and in different departments, and the generation of working models to predict the performance of agents under various working conditions.

Resource Group Assignment Optimization

Figure 6B:
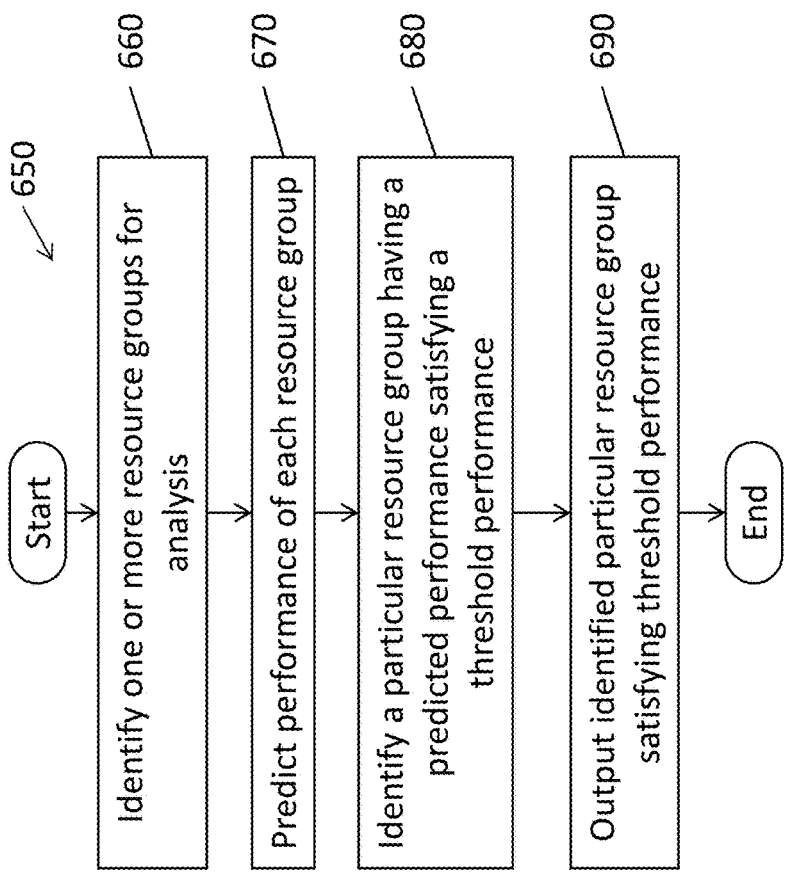
FIG. 6B is a flowchart of a method for generating resource group assignments based on collected data according to one embodiment of the present invention.

According to one embodiment, in addition or in lieu of creating seat assignments, agent performance predictions may also be used to generate optimized resource groups. The resource groups may include agents, supervisors, subject matter experts, equipment, physical computing and telecommunications hardware, workstations, etc. FIG. 6B is a flowchart of a method 650 for generating resource group assignments based on collected data according to one embodiment of the present invention the generating of optimized resource group assignments is similar to the generation of physical arrangements described above with respect to FIG. 6A.

In one embodiment of the present invention, in operation 660, the workforce management server 160 identifies one or more resource groups for analysis. In one embodiment, these resource group assignments may be manually supplied or generated by a human supervisor evaluating the predicted performance of a potential resource group assignment. In one embodiment, the potential resource group assignments are automatically generated based survey data from agents of the contact center regarding their preferred team members, supervisors, experts, and equipment. In one embodiment, potential resource group assignments are automatically generated by making small changes (or perturbations) of a current resource group assignments, where the perturbations may relate to reassigning particular agents (e.g., agents who appear to be a poor match for the resource group based on performance, agents who have particular skills that are missing from the group or who fill a role that is unfilled in the group, and the like), adding or removing experts, and adding or removing equipment (e.g., replacing a printer with a higher capacity printer and/or allocating additional network storage space).

In one embodiment of the present invention, the workforce management server 160 identifies high performing resource groups and generates resource group assignments that mimic the compositions of high performing teams (e.g., providing higher performance computing hardware to teams). In one embodiment, the workforce management server 160 generates all possible resource group assignments for a given shift. In one embodiment, the workforce management server 160 generates all possible resource group assignments across multiple shifts. In one embodiment of the present invention, the workforce management server 160 generates multiples sets of resource group assignments in which every agent (or substantially every agent) of the contact center is assigned to at least one resource group of the set of resource groups, where various teams may be assigned to handle different types of tasks (e.g., technical support versus sales).

In operation 670, the workforce management server 160 predicts the performance of each identified resource group assignment based on the agent models of the agents in the resource group assignment. For example, the agent models may include information about the performance of various agents when working on the same resource group as with various other agents of the contact center. In some instances, the agent model may show a correlation between the agent composition of a resource group and the agent's performance. For example, the agent's performance metrics may be better (or worse) when working in the same resource group as particular other members or when working with particular supervisors or managers. As such, in operation 670 the workforce management server 160 automatically predicts the performance of each agent in the resource group assignment and aggregates the individual predicted performance values to generate a predicted performance of the resource group.

In addition, the agent models may be used to predict future performance, e.g., changes or improvements in performance as the agents learn new roles and as agents become accustomed to working in new resource groups (e.g., with new colleagues). These predicted changes or improvements in performance may vary in accordance with the composition of the resource groups (e.g., particular senior agents may be more skilled at training junior agents than other senior agents). As such, in some embodiments, in operation 670 the workforce management server 160 predicts future performance in accordance with predicted changes in performance of individual agents.

In operation 680, the workforce management server 160 identifies a particular resource group having a predicted performance satisfying a threshold performance level. For example, in operation 670, the predictor may predict an overall net promoter score for the agents in each the resource group. As such, in operation 680, resource groups having a predicted net promoter score exceeding a threshold net promoter score are considered as having a predicted performance satisfying a threshold performance. In other embodiments of the present invention, the workforce management server 160 predicts the overall performance of a set of teams and compares the performance of different sets of teams to identify a complete set of assignments for all the agents of the contact center that improves or maximizes overall contact center performance.

In operation 690, the workforce management server 160 outputs the resource group assignment or a set of resource group assignments having predicted performance satisfying the threshold performance level. In some embodiments of the present invention, the workforce management server 160 outputs all evaluated resource group assignments as a list sorted by predicted performance or may output a list of resource group assignments having predicted performance exceeding a threshold value or being among the resource group assignments having the highest predicted performance (e.g., top ten resource group assignments).

Contact Center Floorplan Optimization

According to some embodiments, collected data on agent performance is correlated with the locations specific workstations within the floorplan of the contact center and the performance data relating to each particular workstation is used to generate an optimized floorplan in accordance with the preferences and performance characteristics of the agents. For example, the identification of key performance metrics (e.g., using the heat map of KPIs) and generation of agent models may identify one or more workstations that consistently underperform (perhaps due to high levels of background noise in the area, distracting location near a break area, and the like). As another example, it may be determined that more agents prefer workstations that have at least some exposure to natural light than there are workstations that have such exposure. As another example, it may be determined that agents in more secluded areas show higher performance.

Therefore, some embodiments of the present invention are directed to the automatic generation of recommendations regarding the number of workstations available that satisfy particular criteria, and the automatic evaluation of a proposed floorplan based on known information about the physical characteristics of the building at each location on the floor. In addition, some embodiments of the present invention may apply optimization and layout algorithms to arrange workstations on the contact center floor to satisfy or maximize the specified criteria. For example, one layout algorithm may attempt to minimize the physical distance between each member of a team and the supervisor of the team by moving agents to open locations that are closer to the supervisor. Another layout algorithm may attempt to reduce the distance between agents and shared resources by distributing the shared resources across the contact center floor in accordance with the usage of those resources (e.g., a heat map may be generated to identify the volume of printer usage by various agents and additional printers or higher capacity printers may be installed at locations having higher printer usage).

Routing Optimization

Some aspects of embodiments of the present invention relate to dynamically routing interactions within a contact center in accordance with circumstances and performance metrics detected based on the physical layout of the contact center. In some embodiments of the present invention, the routing server 124 considers information relating to the key performance indicators of the agents on the contact center floor in making routing decisions. For example, certain types of tasks may be better suited for certain agents at certain times of the days and at certain locations within the contact center. As such, different types of interactions (e.g., simple versus complex, collections versus customer support, and the like) may be routed differently based on the agent performance characteristics, the agent's location, and the time of day.

For example, historical performance characteristics of an agent, which may be stored in the corresponding agent model, may identify an agent as being more capable of addressing complex tasks early in the day, and less capable of addressing those tasks later in the day (e.g., as measured by the agent's net promoter score or average handle time for complex tasks). As such, in some embodiments of the present invention, the routing algorithm implemented by the routing server 124 uses the agent's performance history as a factor in the routing decision (along with, e.g., the current length of the agent's call queue and current average handle time) and routes more complicated tasks (e.g., insurance policy changes) to the agent in the morning, and routes simpler tasks (e.g., address changes) to the agent later in the day.

As another example, the routing server 124 may detect temporary disruptions in agent performance in particular physical locations and reroute interactions to agents based on current performance characteristics. For example, a broken air conditioning vent in one portion of the contact center on a hot day may significantly increase the average handle time of agents in that area. As such, the routing server 124 may detect this increase in average handle time for agents in that region and route incoming interactions to other agents that are unaffected by the air conditioning disruption in order to smooth the call handling.

Figure 6C:
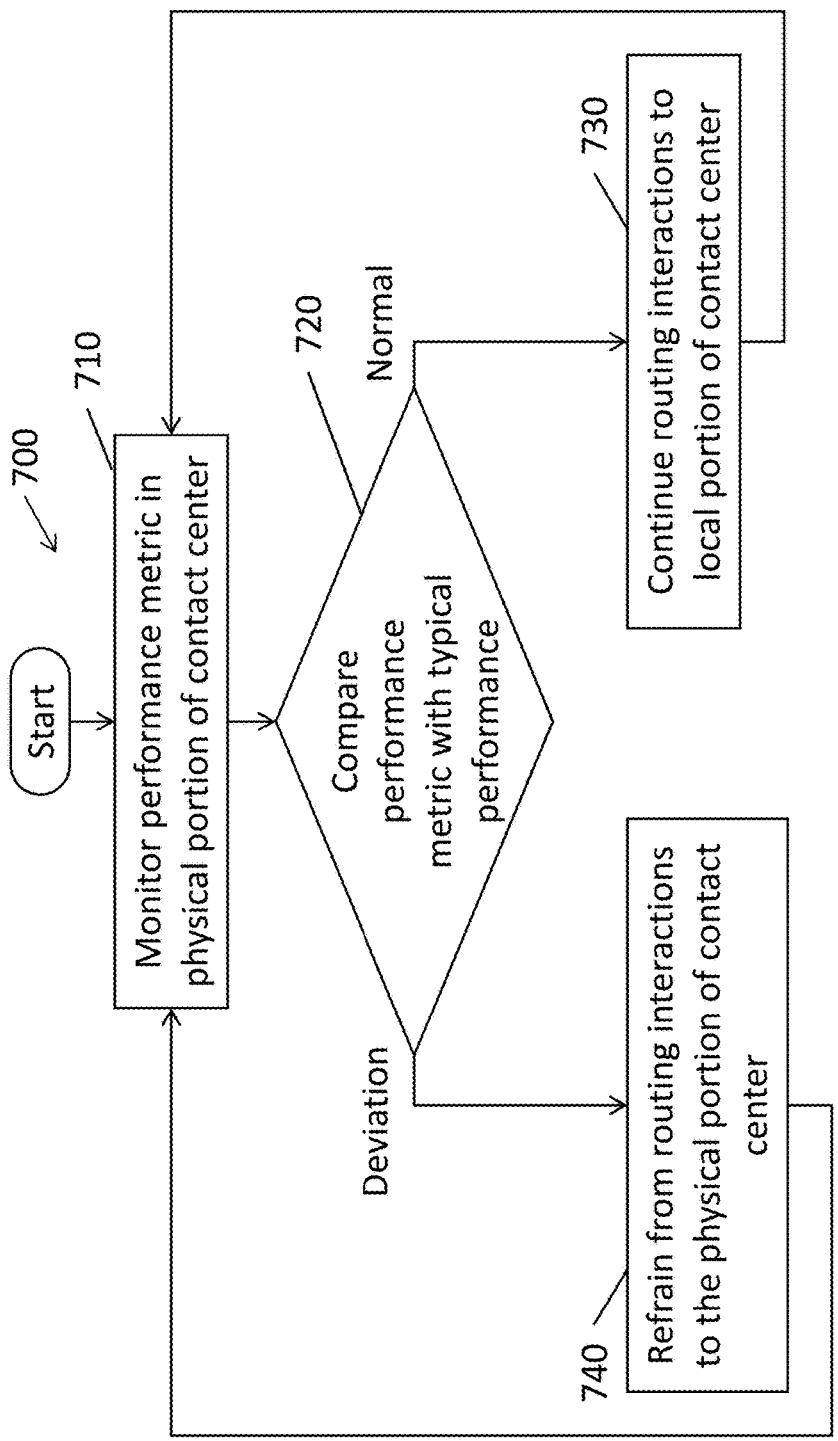
FIG. 6C is a flowchart of a method according to one embodiment of the present invention for optimizing a routing decision based on events occurring within the contact center.

FIG. 6C is a flowchart of a method 700 for optimizing a routing decision based on events occurring within a local portion of the contact center. Referring to FIG. 6C, in operation 710, the workforce management server 160 detects an event (e.g., air conditioning failure) causing unusual performance in a local portion of a contact center (e.g., affecting a small number of workstations) is identified. This identification may be based on a sudden and significant change in real-time key performance metrics of agents in that local portion of the contact center. In operation 720, the routing server 124 stops routing interactions to the local portion of the contact center (e.g., to route fewer calls to the affected area and to route more calls to unaffected areas) in response to receiving, from the workforce management server 160, an indication of a localized problem. In operation 730, the workforce management server 160 monitors the event to determine if the event has ended. If not, then in operation 740, the workforce management server waits (e.g., asynchronously waits) for a period before returning to operation 730 to determine if the event has ended. If the event has ended, then in operation 750, the workforce management server controls the routing server 124 to return to its normal state (e.g., to start routing interactions to the previously affected local portion of the contact center).

As another example, particular types of activities may be better suited for agents in particular locations or types of workstations within the contact center. While it may be suitable for an agent in a noisy area to process a change of address for a customer because the task is relatively simple, more complex or sensitive tasks such as financial transactions may benefit from being processed by an agent in a quieter area or from a more secure workstation (e.g., a workstation having a higher security level). As such, in some embodiments of the present invention, the routing server 124 automatically routes interactions to agents in accordance with physical characteristics of the workstation used by the agent (e.g., in terms of background noise level, privacy level, surrounding activity, workstation security level, and the like) in addition to one or more other factors such as agent skills.

FIG. 6D is a flowchart illustrating a method 800 according to one embodiment of the present invention for routing interactions to agents based on agent's skills as well as physical characteristics of the workstation and predicted agent performance at the agent's current workstation. In operation 810, the routing server 124 identifies one or more agents having a set of skills to satisfy the incoming interaction (for example, if the incoming interaction is a technical support request regarding a particular product, the router 124 identifies those agents having technical support skills in that particular product). In operation 820, in one embodiment, the routing server 124 sends the skills required for the incoming interaction and the collection of identified agents to the workforce management server 160 to compute, for each identified agent, a predicted performance on the incoming interaction given the agent's current working environment. This may be performed by supplying the skills and the agent working environment to the agent models. In another embodiment, the routing server 124 automatically identifies one or more agents of the identified agents in accordance with the skills required by the incoming interaction and the agent models. In operation 830, one or more recipient agents having a predicted performance metric satisfying a threshold performance is then identified. In operation 840, the routing server 124 routes the incoming interaction to at least one of the identified recipient agents.

Computing Devices

As described herein, various applications and aspects of the present invention may be implemented in software, firmware, hardware, and combinations thereof. When implemented in software, the software may operate on a general purpose computing device such as a server, a desktop computer, a tablet computer, a smartphone, personal digital assistant, or an embedded system such as a computer system embedded in a device to create an internet-of-things (IoT) device. Such a general purpose computer includes a general purpose processor and memory.

Each of the various servers, controllers, switches, gateways, engines, and/or modules (collectively referred to as servers) in the afore-described figures may be a process or thread, running on one or more processors, in one or more computing devices 1500 (e.g., FIG. 7A, FIG. 7B), executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that a computing device may be implemented via firmware (e.g., an application-specific integrated circuit), hardware, or a combination of software, firmware, and hardware. A person of skill in the art should also recognize that the functionality of various computing devices may be combined or integrated into a single computing device, or the functionality of a particular computing device may be distributed across one or more other computing devices without departing from the scope of the exemplary embodiments of the present invention. A server may be a software module, which may also simply be referred to as a module. The set of modules in the contact center may include servers, and other modules.

The various servers may be located on a computing device on-site at the same physical location as the agents of the contact center or may be located off-site (or in the cloud) in a geographically different location, e.g., in a remote data center, connected to the contact center via a network such as the Internet. In addition, some of the servers may be located in a computing device on-site at the contact center while others may be located in a computing device off-site, or servers providing redundant functionality may be provided both via on-site and off-site computing devices to provide greater fault tolerance. In some embodiments of the present invention, functionality provided by servers located on computing devices off-site may be accessed and provided over a virtual private network (VPN) as if such servers were on-site, or the functionality may be provided using a software as a service (SaaS) to provide functionality over the internet using various protocols, such as by exchanging data using encoded in extensible markup language (XML) or JavaScript Object notation (JSON).

Figure 7A:
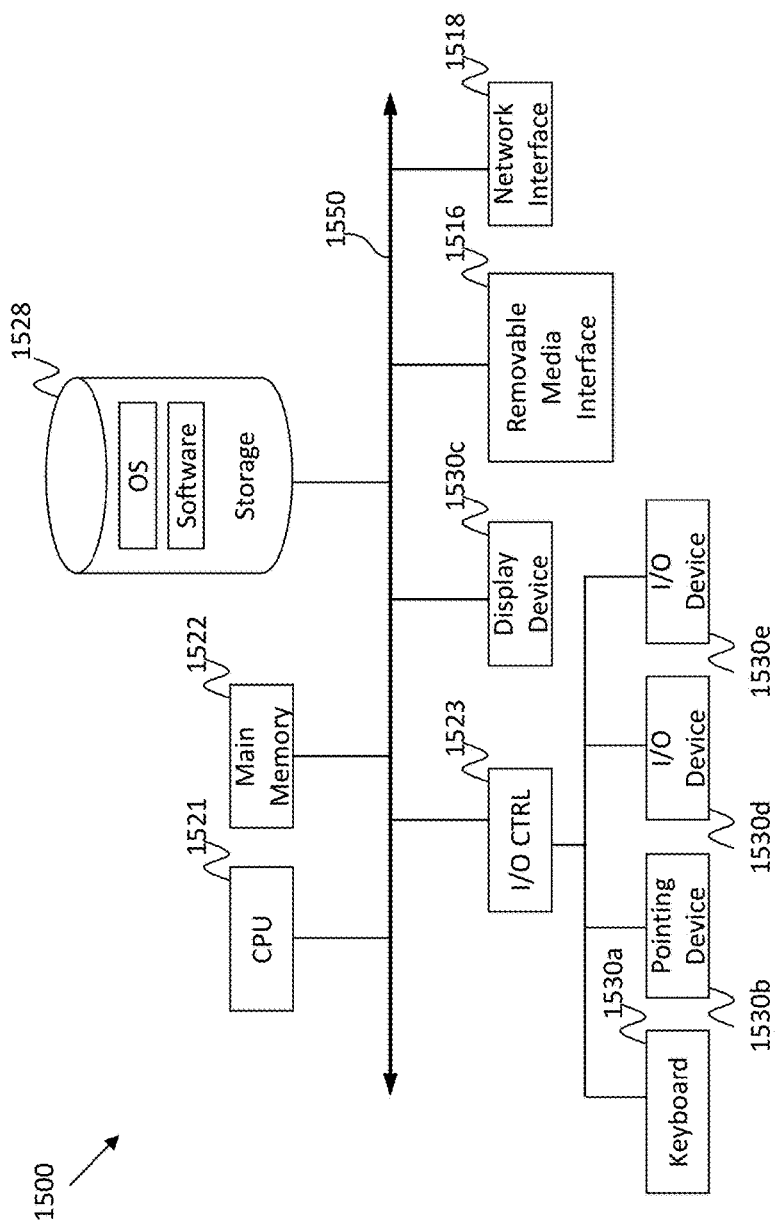
FIG. 7A is a block diagram of a computing device according to an embodiment of the present invention.
Figure 7B:
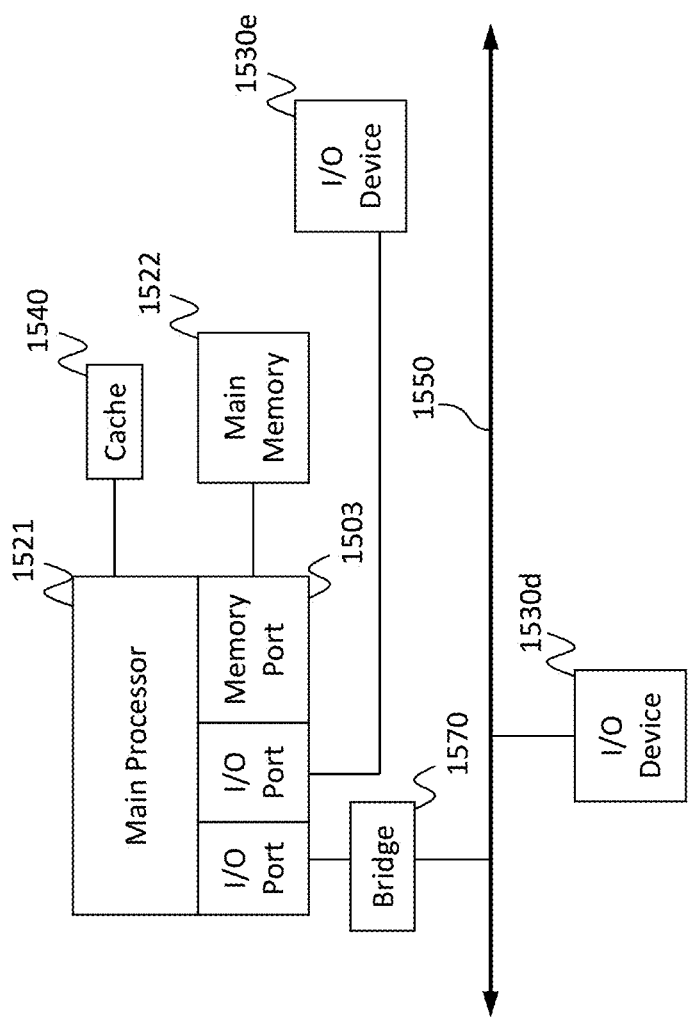
FIG. 7B is a block diagram of a computing device according to an embodiment of the present invention.

FIG. 7A-FIG. 7B depict block diagrams of a computing device 1500 as may be employed in exemplary embodiments of the present invention. Each computing device 1500 includes a central processing unit 1521 and a main memory unit 1522. As shown in FIG. 7A, the computing device 1500 may also include a storage device 1528, a removable media interface 1516, a network interface 1518, an input/output (I/O) controller 1523, one or more display devices 1530*c*, a keyboard 1530*a* and a pointing device 1530*b*, such as a mouse. The storage device 1528 may include, without limitation, storage for an operating system and software. As shown in FIG. 7B, each computing device 1500 may also include additional optional elements, such as a memory port 1503, a bridge 1570, one or more additional input/output devices 1530*d*, 1530*e* and a cache memory 1540 in communication with the central processing unit 1521. The input/output devices 1530*a*, 1530*b*, 1530*d*, and 1530*e* may collectively be referred to herein using reference numeral 1530.

The central processing unit 1521 is any logic circuitry that responds to and processes instructions fetched from the main memory unit 1522. It may be implemented, for example, in an integrated circuit, in the form of a microprocessor, microcontroller, or graphics processing unit (GPU), or in a field-programmable gate array (FPGA) or application-specific integrated circuit (ASIC). The main memory unit 1522 may be one or more memory chips capable of storing data and allowing any storage location to be directly accessed by the central processing unit 1521. As shown in FIG. 7A, the central processing unit 1521 communicates with the main memory 1522 via a system bus 1550. As shown in FIG. 7B, the central processing unit 1521 may also communicate directly with the main memory 1522 via a memory port 1503.

FIG. 7B depicts an embodiment in which the central processing unit 1521 communicates directly with cache memory 1540 via a secondary bus, sometimes referred to as a backside bus. In other embodiments, the central processing unit 1521 communicates with the cache memory 1540 using the system bus 1550. The cache memory 1540 typically has a faster response time than main memory 1522. As shown in FIG. 7A, the central processing unit 1521 communicates with various I/O devices 1530 via the local system bus 1550. Various buses may be used as the local system bus 1550, including a Video Electronics Standards Association (VESA) Local bus (VLB), an Industry Standard Architecture (ISA) bus, an Extended Industry Standard Architecture (EISA) bus, a MicroChannel Architecture (MCA) bus, a Peripheral Component Interconnect (PCI) bus, a PCI Extended (PCI-X) bus, a PCI-Express bus, or a NuBus. For embodiments in which an I/O device is a display device 1530*c*, the central processing unit 1521 may communicate with the display device 1530*c* through an Advanced Graphics Port (AGP). FIG. 7B depicts an embodiment of a computer 1500 in which the central processing unit 1521 communicates directly with I/O device 1530*e*. FIG. 7B also depicts an embodiment in which local busses and direct communication are mixed: the central processing unit 1521 communicates with I/O device 1530*d* using a local system bus 1550 while communicating with I/O device 1530*e* directly.

A wide variety of I/O devices 1530 may be present in the computing device 1500. Input devices include one or more keyboards 1530*a*, mice, trackpads, trackballs, microphones, and drawing tablets. Output devices include video display devices 1530*c*, speakers, and printers. An I/O controller 1523, as shown in FIG. 7A, may control the I/O devices. The I/O controller may control one or more I/O devices such as a keyboard 1530*a* and a pointing device 1530*b*, e.g., a mouse or optical pen.

Referring again to FIG. 7A, the computing device 1500 may support one or more removable media interfaces 1516, such as a floppy disk drive, a CD-ROM drive, a DVD-ROM drive, tape drives of various formats, a USB port, a Secure Digital or COMPACT FLASH™ memory card port, or any other device suitable for reading data from read-only media, or for reading data from, or writing data to, read-write media. An I/O device 1530 may be a bridge between the system bus 1550 and a removable media interface 1516.

The removable media interface 1516 may for example be used for installing software and programs. The computing device 1500 may further include a storage device 1528, such as one or more hard disk drives or hard disk drive arrays, for storing an operating system and other related software, and for storing application software programs. Optionally, a removable media interface 1516 may also be used as the storage device. For example, the operating system and the software may be run from a bootable medium, for example, a bootable CD.

In some embodiments, the computing device 1500 may include or be connected to multiple display devices 1530*c*, which each may be of the same or different type and/or form. As such, any of the I/O devices 1530 and/or the I/O controller 1523 may include any type and/or form of suitable hardware, software, or combination of hardware and software to support, enable or provide for the connection to, and use of, multiple display devices 1530*c* by the computing device 1500. For example, the computing device 1500 may include any type and/or form of video adapter, video card, driver, and/or library to interface, communicate, connect, or otherwise use the display devices 1530c. In one embodiment, a video adapter may include multiple connectors to interface to multiple display devices 1530c. In other embodiments, the computing device 1500 may include multiple video adapters, with each video adapter connected to one or more of the display devices 1530c. In some embodiments, any portion of the operating system of the computing device 1500 may be configured for using multiple display devices 1530c. In other embodiments, one or more of the display devices 1530c may be provided by one or more other computing devices, connected, for example, to the computing device 1500 via a network. These embodiments may include any type of software designed and constructed to use the display device of another computing device as a second display device 1530c for the computing device 1500. One of ordinary skill in the art will recognize and appreciate the various ways and embodiments that a computing device 1500 may be configured to have multiple display devices 1530c.

A computing device 1500 of the sort depicted in FIG. 7A-FIG. 7B may operate under the control of an operating system, which controls scheduling of tasks and access to system resources. The computing device 1500 may be running any operating system, any embedded operating system, any real-time operating system, any open source operating system, any proprietary operating system, any operating systems for mobile computing devices, or any other operating system capable of running on the computing device and performing the operations described herein.

The computing device 1500 may be any workstation, desktop computer, laptop or notebook computer, server machine, handheld computer, mobile telephone or other portable telecommunication device, media playing device, gaming system, mobile computing device, or any other type and/or form of computing, telecommunications or media device that is capable of communication and that has sufficient processor power and memory capacity to perform the operations described herein. In some embodiments, the computing device 1500 may have different processors, operating systems, and input devices consistent with the device.

In other embodiments the computing device 1500 is a mobile device, such as a Java-enabled cellular telephone or personal digital assistant (PDA), a smart phone, a digital audio player, or a portable media player. In some embodiments, the computing device 1500 includes a combination of devices, such as a mobile phone combined with a digital audio player or portable media player.

Figure 7D:
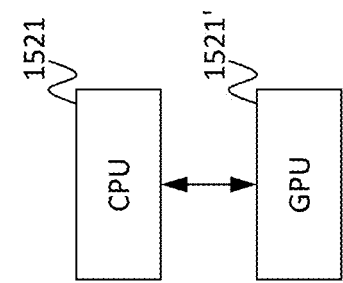
FIG. 7D is a block diagram of a computing device according to an embodiment of the present invention.
Figure 7C:
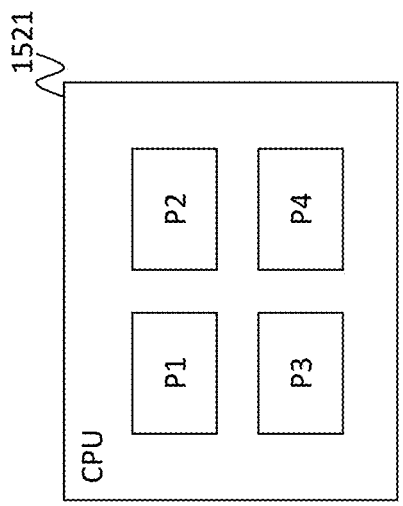
FIG. 7C is a block diagram of a computing device according to an embodiment of the present invention.

As shown in FIG. 7C, the central processing unit 1521 may include multiple processors P1, P2, P3, P4, and may provide functionality for simultaneous execution of instructions or for simultaneous execution of one instruction on more than one piece of data. In some embodiments, the computing device 1500 may include a parallel processor with one or more cores. In one of these embodiments, the computing device 1500 is a shared memory parallel device, with multiple processors and/or multiple processor cores, accessing all available memory as a single global address space. In another of these embodiments, the computing device 1500 is a distributed memory parallel device with multiple processors each accessing local memory only. In still another of these embodiments, the computing device 1500 has both some memory which is shared and some memory which may only be accessed by particular processors or subsets of processors. In still even another of these embodiments, the central processing unit 1521 includes a multicore microprocessor, which combines two or more independent processors into a single package, e.g., into a single integrated circuit (IC). In one exemplary embodiment, depicted in FIG. 7D, the computing device 1500 includes at least one central processing unit 1521 and at least one graphics processing unit 1521'.

In some embodiments, a central processing unit 1521 provides single instruction, multiple data (SIMD) functionality, e.g., execution of a single instruction simultaneously on multiple pieces of data. In other embodiments, several processors in the central processing unit 1521 may provide functionality for execution of multiple instructions simultaneously on multiple pieces of data (MIMD). In still other embodiments, the central processing unit 1521 may use any combination of SIMD and MIMD cores in a single device.

Figure 7E:
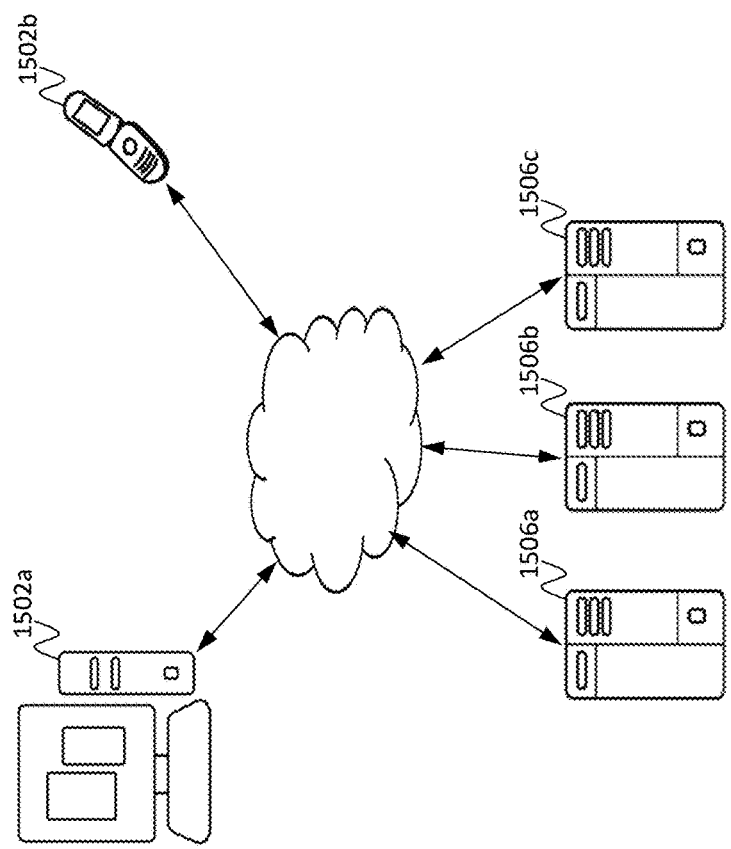
FIG. 7E is a block diagram of a network environment including several computing devices according to an embodiment of the present invention.

A computing device may be one of a plurality of machines connected by a network, or it may include a plurality of machines so connected. FIG. 7E shows an exemplary network environment. The network environment includes one or more local machines 1502a, 1502b (also generally referred to as local machine(s) 1502, client(s) 1502, client node(s) 1502, client machine(s) 1502, client computer(s) 1502, client device(s) 1502, endpoint(s) 1502, or endpoint node(s) 1502) in communication with one or more remote machines 1506a, 1506b, 1506c (also generally referred to as server machine(s) 1506 or remote machine(s) 1506) via one or more networks 1504. In some embodiments, a local machine 1502 has the capacity to function as both a client node seeking access to resources provided by a server machine and as a server machine providing access to hosted resources for other clients 1502a, 1502b. Although only two clients 1502 and three server machines 1506 are illustrated in FIG. 7E, there may, in general, be an arbitrary number of each. The network 1504 may be a local-area network (LAN), e.g., a private network such as a company Intranet, a metropolitan area network (MAN), or a wide area network (WAN), such as the Internet, or another public network, or a combination thereof.

The computing device 1500 may include a network interface 1518 to interface to the network 1504 through a variety of connections including, but not limited to, standard telephone lines, local-area network (LAN), or wide area network (WAN) links, broadband connections, wireless connections, or a combination of any or all of the above. Connections may be established using a variety of communication protocols. In one embodiment, the computing device 1500 communicates with other computing devices 1500 via any type and/or form of gateway or tunneling protocol such as Secure Socket Layer (SSL) or Transport Layer Security (TLS). The network interface 1518 may include a built-in network adapter, such as a network interface card, suitable for interfacing the computing device 1500 to any type of network capable of communication and performing the operations described herein. An I/O device 1530 may be a bridge between the system bus 1550 and an external communication bus.

According to one embodiment, the network environment of FIG. 7E may be a virtual network environment where the various components of the network are virtualized. For example, the various machines 1502 may be virtual machines implemented as a software-based computer running on a physical machine. The virtual machines may share the same operating system. In other embodiments, different operating system may be run on each virtual machine instance. According to one embodiment, a "hypervisor" type of virtualization is implemented where multiple virtual machines run on the same host physical machine, each acting as if it has its own dedicated box. Of course, the virtual machines may also run on different host physical machines.

Other types of virtualization is also contemplated, such as, for example, the network (e.g. via Software Defined Networking (SDN)). Functions, such as functions of the session border controller and other types of functions, may also be virtualized, such as, for example, via Network Functions Virtualization (NFV).

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A method comprising:
   identifying, by a processor, one or more physical arrangements of resources in a customer contact center, the resources comprising shared equipment and assigned agent seats;
   predicting, by the processor, for each of the one or more physical arrangements of resources, a predicted performance metric of the physical arrangement of resources in accordance with one or more working environment parameters of the customer contact center, the working environment parameters comprising proximities of agents to shared equipment;
   identifying, by the processor, a particular physical arrangement of the one or more physical arrangements having a corresponding predicted performance metric satisfying a threshold performance among the one or more physical arrangements; and
   outputting, by the processor, the particular physical arrangement of resources in the customer contact center,
   wherein the predicting the predicted performance metric for the physical arrangement of resources in the customer contact center comprises:
      retrieving, by the processor, a plurality of predictors of agent performance, each predictor corresponding to one of a plurality of agents of the customer contact center;
      predicting, by the processor, a predicted performance metric of each agent in the physical arrangement of resources based on the plurality of predictors of agent performance; and
      computing, by the processor, the predicted performance metric of the physical arrangement of resources in the customer contact center in accordance with the predicted performance metric of each agent in the physical arrangement of resources.

2. The method of claim 1, wherein a predictor of the plurality of predictors of agent performance is generated by:
   retrieving one or more historical performance metrics of an agent corresponding to the predictor;
   retrieving one or more historical working environment parameters corresponding to the agent;
   correlating the one or more historical performance metrics of the agent with the one or more historical working environment parameters of the agent; and
   computing a plurality of parameters controlling a relationship between the one or more historical working environment parameters of the agent and the one or more historical performance metrics of the agent.

3. The method of claim 1, wherein each of the plurality of predictors of agent performance comprises a linear regression model between the one or more working environment parameters and a performance metric, the working environment parameters comprising a physical characteristic of a location within a customer contact center.

4. The method of claim 1, wherein each of the plurality of predictors of agent performance comprises a neural network having input features comprising the one or more working environment parameters, and an output corresponding to the predicted performance metric.

5. The method of claim 1, wherein the one or more working environment parameters comprise at least one of:
   air temperature;
   noise level;
   light level;
   distance to one or more locations within the customer contact center; and
   security level.

6. The method of claim 5, wherein at least one of the one or more working environment parameters is collected by a plurality of sensors located in the customer contact center.

7. The method of claim 5, wherein the noise level is collected from one or more recordings of voice interactions between agents and customers.

8. The method of claim 5, wherein the distance to the one or more locations within the customer contact center is computed from one or more floor plans of the customer contact center.

9. The method of claim 5, wherein the light level is estimated based on one or more floor plans of the customer contact center.

10. The method of claim 1, wherein the predicted performance metric comprises at least one of agent utilization, agent occupancy, average handle time, average hold time, first call resolution rate, abandonment rate, net promoter score, conversion rate, agent adherence to workforce schedule, and agent mood.

11. A system comprising:
    a processor; and
    memory having instructions stored thereon that, when executed by the processor, cause the processor to:
       identify one or more physical arrangements of resources in a customer contact center, the resources comprising shared equipment and assigned agent seats;
       predict, for each of the one or more physical arrangements of resources, a predicted performance metric of the physical arrangement of resources in accordance with one or more working environment parameters of the customer contact center, the working environment parameters comprising proximities of agents to shared equipment;
       identify a particular physical arrangement of the one or more physical arrangements having a corresponding predicted performance metric satisfying a threshold performance among the one or more physical arrangements;
       output the particular physical arrangement of resources in the customer contact center;
       retrieve a plurality of predictors of agent performance, each predictor corresponding to one of a plurality of agents of the customer contact center;
       predict a predicted performance metric of each agent in the physical arrangement of resources based on the plurality of predictors of agent performance; and
       compute a predicted overall performance of the physical arrangement of resources in the customer contact center in accordance with the predicted performance metric of each agent in the physical arrangement of resources.

12. The system of claim 11, wherein a predictor of the plurality of predictors of agent performance is generated by:
retrieving one or more historical performance metrics of an agent corresponding to the predictor;
retrieving one or more historical working environment parameters corresponding to the agent;
correlating the one or more historical performance metrics of the agent with the one or more historical working environment parameters of the agent; and
computing a plurality of parameters controlling a relationship between the one or more historical working environment parameters and the one or more historical performance metrics.

13. The system of claim 11, wherein the one or more working environment parameters comprise at least one of:
air temperature;
noise level;
light level;
distance to one or more locations within the customer contact center; and
security level.

\* \* \* \* \*